United States Patent [19]

Pieters

[11] 3,835,245

[45] Sept. 10, 1974

[54] INFORMATION MODIFICATION IN IMAGE ANALYSIS SYSTEMS EMPLOYING LINE SCANNING

[75] Inventor: Leon Andre Pieters, Cambridge, England

[73] Assignee: Image Analysing Computers Limited, Melbourn, Royston, England

[22] Filed: Aug. 7, 1972

[21] Appl. No.: 278,279

[30] Foreign Application Priority Data

Aug. 7, 1971 Great Britain .................... 37226/71

[52] U.S. Cl........ 178/6.8, 178/DIG. 6, 178/DIG. 22, 178/DIG. 36, 340/324 A

[51] Int. Cl. .............................................. H04n 7/18

[58] Field of Search......... 178/6.8, DIG. 6, DIG. 36, 178/DIG. 22; 340/324 A

[56] References Cited

UNITED STATES PATENTS 2,986,596 5/1961 Hammond ........................... 178/6.8

3,617,630 11/1971 Reiffel ........................... 178/DIG. 6

*Primary Examiner*—Howard W. Britton

*Attorney, Agent, or Firm*—Oblon, Fisher, Spivak, McClelland & Maier

[57] ABSTRACT

Image analysis apparatus and methods of operating same, having a surface on which outlines or areas can be delineated by hand, using either a light pen or conventional drawing instrument such as a pencil and near or on which a representation of a field under analysis is generated, a scanner for generating a video signal relating to the delineated outline or area in synchronism with the scanning of the field under analysis and circuit means for combining the video signal pulses obtained from scanning the field with pulses obtained from the video signal relating to the delineation.

47 Claims, 27 Drawing Figures

INFORMATION MODIFICATION IN IMAGE ANALYSIS SYSTEMS EMPLOYING LINE SCANNING

Figure 1:
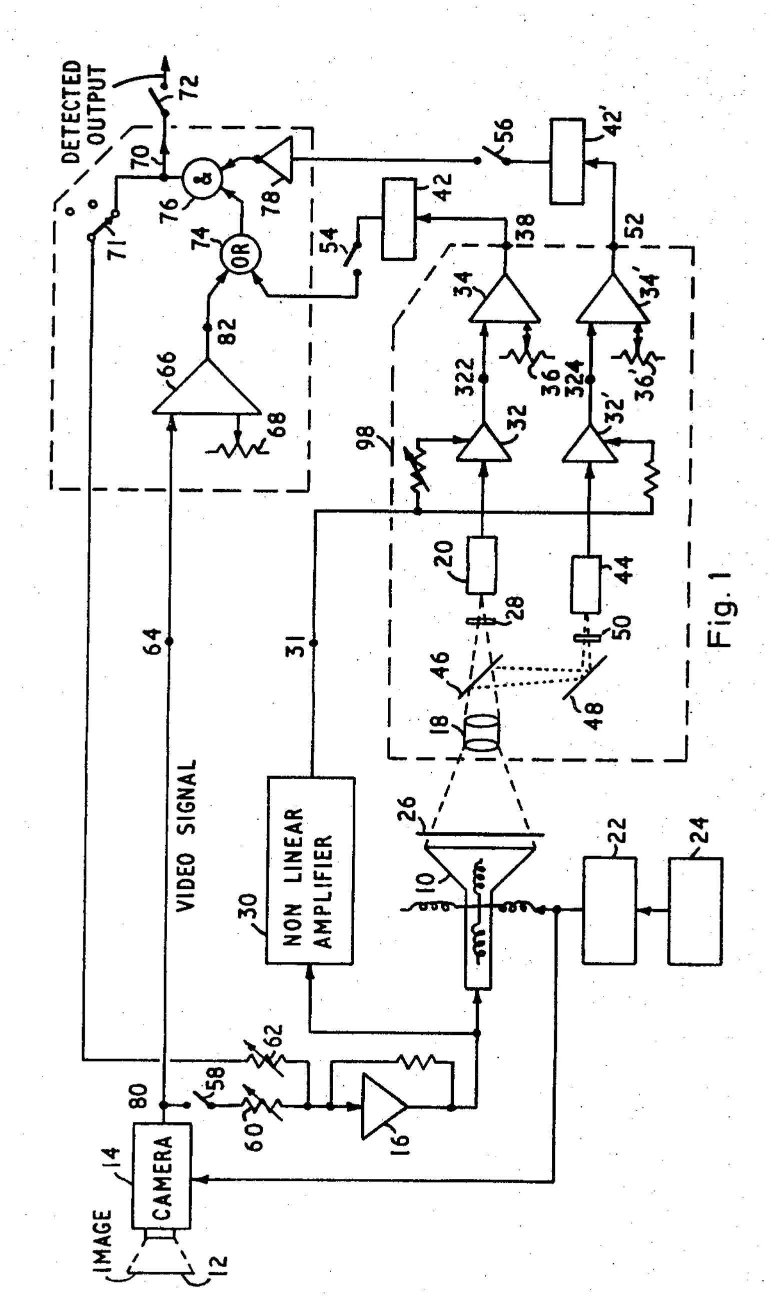

This invention concerns methods and apparatus whereby electrical picture signals obtained by line scanning and relating to certain regions in a field may be isolated from the remaining signals relating to the field and whereby isolated electrical signals may be amended or modified.

The term "picture signal" herein means an amplitude modulated video signal or a two level signal obtained by threshold detection of an amplitude modulated video signal with reference to a threshold or reference voltage.

The term "feature" herein used is intended to mean any region of a field which by virtue of its contrast or colour can be distinguished from its surroundings. Thus a white area surrounded by a grey or black region can be described as a white feature.

The invention provides a method of isolating picture signals corresponding to a selected region of the field comprising the steps of scanning the field or an image thereof to produce a picture signal representative of the field, generating a representation of the field on or near to a surface, delineating the selected region on the surface, generating a second picture signal which represents the delineated region in synchronism with the scanning of the field or image thereof, generating gating pulses from the second picture signal and gating the first picture signal by said gating pulses.

The gating may be to allow all of the first picture signals to pass except those coincident with gating pulses (i.e. all except those which arise from the field within the delineated region) or vice versa.

Preferably the second picture signal is also produced by line scanning.

Preferably the representation of the original field is removed and uniform illumination (or no illumination if appropriate) is applied to the surface while the delineated marks are scanned to produce the second picture signal.

The invention also provides a method of amending a picture signal obtained by scanning a field or image thereof containing features, comprising the steps of scanning the field or an image thereof to produce a first picture signal representative of the field, delineating on a surface a correction required to a feature or group of features, generating a second picture signal which represents the delineations in synchronism with the generation of the first picture signal and combining the first and second picture signals.

Preferably the second picture signal is also produced by scanning.

Preferably a representation of the field or image thereof is generated on or near the said surface, to facilitate the location of the delineated correction. In this event the representation is preferably removed at least from the field of view of the means scanning the delineations to produce the second picture signal.

Alternatively the first picture signal may be inverted as previously described and combined with the second video signal to cancel out the first signal component therein.

Where the first and second picture signals are amplitude modulated video signals the combination is effected by means of an adding stage having appropriate band width.

Where the two picture signals are two value signals such as obtained by threshold detection of the original amplitude modulated video signals, the combination may be effected by a gate having a logic OR function.

In one arrangement an image of the field is produced optically on the surface to form the representation of the field and after delineation the surface is imaged and scanned by a television camera or other scanning device. Preferably the optical image is removed prior to scanning the delineations on the surface.

Preferably however the representation of the field is formed on the screen of a C.R.T. in an image reproducer driven by the picture signal obtained by scanning the field or an image thereof and the C.R.T. screen can be seen through or the image thereon is projected onto said surface.

Where the representation is obtained from a C.R.T., the actual video signal obtained by scanning the field or an image thereof may be subjected to threshold detection to produce a two level detected signal which may be displayed either instead of or in addition to the original video signal on the C.R.T. Preferably the C.R.T. is blanked so as to provide uniform illumination of the screen, when the delineated marking is to be scanned.

Preferably a C.R.T. having a long decay phosphor is employed.

In one arrangement the C.R.T. screen is focussed onto a photomultiplier target and the scanning spot of the C.R.T. and photo-cell combine to form a flying spot scanner. The delineations are conveniently made in opaque ink or other writing material on the surface of the C.R.T. or a glass plate situated just in front thereof.

In order to reduce the effect of ambient light variation the C.R.T. is preferably a dual phosphor tube, the secondary phosphor producing a U.V. component and the photomultiplier is only sensitive to U.V. light. In this event the delineating material must be U.V. absorbing.

The delineation may comprise a line in the form of a closed loop or may comprise a plurality of points defining for example the corners of triangle or rectangle or selected points of more complex shapes.

The delineation may be by way of a pencil or crayon or the like on a suitable surface on which or through which the representation of the original field can be seen, means being provided for illuminating and scanning the surface to produce a video signal corresponding to the delineated markings.

Alternatively the delineation may be effected electronically by means of a so-called "Light Pen" on the screen of a C.R.T. which is scanned in synchronism with the scanning of the field or image thereof and has supplied thereto the first picture signal (as hereinbefore defined) derived from scanning the field or image thereof, for displaying the representation of the field thereon. In this event a memory is provided to store the instantaneous co-ordinate positions of the light pen relative to the scan raster and addressing means are provided for reading the stored signals in synchronism with the scanning to release the stored signals as the second picture signal. The latter may be applied to a video signal amplifier adapted to adjust the brightness of the scanning spot of the C.R.T. in response to the signals from the memory, to produce for example a bright line trace or a bright area on the C.R.T., over the region thereof determined by the stored co-ordinate values.

Whatever method of delineation and storage of the delineated region is employed circuit means is preferably provided responsive to the short duration video signal pulses obtained from scanning line segments of an outline type delineation, the circuit means converting the short duration signal pulses into gating pulses which if employed to cause brightening of the scanning spot of a C.R.T. which is scanned in synchronism with the scanning of the field or image thereof, will produce a bright region on the C.R.T. screen corresponding in shape and proportional in size to the delineated outline.

Alternatively the delineation may comprise the masking or painting out of a selected region by means of a pencil or crayon or the like. Subsequent scanning of the delineation will produce a video signal from which (by threshold detection) the gating pulses can be directly derived. As before, if the gating pulses are used to bright up the scanning point of a C.R.T. set to scan in synchronism with the scanning of the field or image thereof, the resulting brightened up region will correspond in position and will be proportional in size to the delineated area. Where the delineation is a complete painting out or masking of the region, the video signal pulses obtained from scanning the delineation can be converted directly to gating pulses by suitable threshold detection of the video signal and no additional circuit means is necessary for generating the in-fill signal pulses as previously required when the delineation is in the form of an outline only.

Where the delineation defines a closed loop or forms a closed loop with the boundary of the field of view of the scanning means scanning the surface containing the delineations, it is possible to use the gating pulses generated from the outline pulses to release the first picture signal corresponding either to the region bounded by the delineation (or the delineation and field boundary) or to the region outside the bounded region. As before mentioned delineation includes an outline or suitable strategic points defining an area or also includes the total painting out of the desired or undesired area as the case may be.

In a particular application it is possible to "paint out" the overlapping or touching portion of two otherwise separate features which because they overlap or touch would therefore be treated as a single feature and counted and/or measured as a single feature by an image analysing computer such as described in our British Patent Specification No. 1,264,804 and to use the gating pulses derived from scanning the delineation to remove those portions of the picture signal pulses relating to the two joined features which correspond to the overlapping or touching portion of the features. In this context the term "painted out area" includes a thin delineated line which is nevertheless sufficient when scanned to produce an electrical gating pulse suitable to cause a break in each signal pulse otherwise obtained from scanning of the two features in the field.

Combination of two picture signals is of advantage in the event that for example it is impossible to set a threshold voltage relative to the video signal amplitude excursions obtained by scanning the field or image thereof, so that not all amplitude excursions are correctly detected for example due to noise, so that when displayed used to control the brightness of a C.R.T. the detected signal pulses obtained by threshold detecting the video signal of the field, generate "features" which have regions missing therefrom. In this event an incorrect size value for the feature would be obtained as a result of performing measurements on the first picture signal pulses for example in the manner described in our British Patent Specification Number 1,264,805. Thus in the example quoted, the missing portion of the features displayed in the representation of the field may be delineated on the sketch pad surface, the delineations scanned to produce a second picture signal, the amplitude excursions thereof detected by a threshold detector to produce the missing detected signal pulses or pulse portions (constituting a subsidiary detected signal) and the pulses of the subsidiary detected signal combined with those of the detected signal from the threshold detector operating on the video signal obtained by scanning the field or an image thereof (hereinafter referred to as the original video signal). The combined signal pulses are supplied to the input of the computing circuit such as that of our Specification No. 1,264,805.

Alternative combination of two value picture signals may be obtained by using the picture signal or gating pulses derived therefrom to modify the output of the detector operating on the original video signal.

Two or more features displayed in the representation of the field as being separated can be "joined" by delineating on the surface a bridging portion to close the gap between the two features in the representation of the field. The detected signal pulses obtained from scanning the delineation will merge with those from scanning the field (or image thereof) and fill in the gaps between the pulses corresponding to the two features. In consequence, for example, only a single count pulse will be obtained for the two features in a counting circuit such as described in our British Patent Specification Number 1,264,807.

It will be appreciated that if a delineation on the surface is made in a different colour or different grey from another delineation, the picture signal relating to the one can be separated from that relating to the other by suitable optical filtering means and a corresponding number of scanning devices for generating the two or more second picture signals corresponding to the various differently coloured delineations. Alternatively if time is unimportant, different optical filtering devices can be inserted between the surface and the scanning means during successive frame scans to obtain a form of time multiplexing, the output of the scanning device being gated during the appropriate frame scans to produce the different picture signals which then require storage if required simultaneously. Alternatively a single scanning device is employed with no optical filtering means and the amplitude modulated video signal obtained from the scanning device is applied to two or more threshold detectors having appropriate threshold levels to enable different amplitude level excursions of the video signal to be distinguished one from the other.

It will also be appreciated that where it is desired to combine amplitude modulated video signals, the ability to delineate grey levels or different colours can allow the operator to improve the video signal amplitude excursions of the first picture signal by appropriate shading or otherwise delineating on the surface to the precise colour or grey level to compensate for those portions of for example features or regions of the field which for some reason or another are insufficiently distinguishable from surrounding regions to allow the amplitude excursions relating to the feature to be distinguished from those relating to the surroundings by threshold detection. The additive correction of combination of the second picture signal and the first picture signal amplitudes will compensate for any fall off of amplitude for example due to uneven illumination of the feature and will provide a better amplitude modulated video signal for detection and subsequent measurement.

Additionally the delineated marks may represent coded information relating to features in the field. For example in a shape classification it may be desired to count and/or perform measurements on all the features of one particular shape or to count and/or perform measurements on each group of features having characteristic shapes such as circles, rectangles, triangles, etc. This can be achieved by employing a code number for example I, II and III for each of the three different shapes respectively and delineating appropriate marks (i.e. ', '' or ''') on the sketch pad surface so as to register within the features which are to be classified. Thus a single dash can be used to denote one shape, two dashes another shape and three dashes a third shape. The second picture signal obtained by scanning the delineations will then contain pulse trains which if decoded so as to produce a digital number corresponding thereto, will provide an identification signal for each feature so coded. Preferably this method of delineation is combined by outline delineation of the selected features, to isolate the first picture signal content relating thereto from the remaining first picture signal.

A count pulse and/or parameter measurement signal may be obtained for each feature from the pulses forming the first picture signal in the manner described in our British Patent Specification No. 1,264,804. This involves supplying the first picture signal pulses to the input of an associated parameter computer controlled by a coincidence detector circuit, the latter generating a unique pulse for each feature after the last line scan intersection with the feature. The decoded identification signals may be applied as an input to a second associated parameter computer operating in synchronism with the first associated parameter computer and preferably from the same coincidence detector circuit, in the manner described in our co-pending U.S. application Ser. No. 85,383. The coded information signal for each feature will then be built up within the second associated parameter computer and will be available for release by the unique signal pulse for each feature when released by the coincidence detector circuit. The information signal released by the second computer can be employed to channel computed information such as an area value for each feature to one of several registers depending on the value of the information signal from the second parameter computer for the feature concerned. In addition it may be arranged that in the event that no coded information signal is available from the second computer for any particular feature, that the area value for that feature will not be submitted to the classification at all.

The second picture signal pulses may also be supplied to an associated parameter computer of the type described in our U.S. Pat. No. 3,619,494, whereby measurements may be made on the electrical signal pulses relating to the delineated marks. Thus for example the area of delineated region may be calculated by supplying to the aforementioned computer all the gating pulses defining the region. Furthermore a line (parallel to the line scan direction) may be drawn on the surface to represent the longest dimension of a feature displayed in the representation of the field. The line constitutes the delineated mark and the length of the line can be measured in known manner by measuring the duration of the signal pulse in the second picture signal produced on line scans of the scanning means scanning the sketch pad surface, which intersect the delineated line. In a similar manner other dimensions of features may be drawn and measured.

Circuit means for generating gating pulses from short duration pulses corresponding to an outline feature conveniently comprises a bistable device having SET and RESET inputs and an output which rises from zero to an output signal level when the bistable device is in its SET condition and reverts to zero when in its RESET condition, a delay device for delaying the output signals of the bistable device by a time interval of the order of one line scan period and inverting amplifier means responsive to the output of the delay device and the signals supplied to the SET input of the bistable device to generate a RESET signal when there is no signal at the SET input of the bistable device and there is also no signal in the output of the delay device. Conveniently the time delay introduced by the delay device is a short increment of time less than one line scan period.

Alternatively the circuit means for generating the gating pulses from picture signal pulses obtained by scanning an outline delineation comprises a retriggerable monostable device triggered into its unstable condition by the trailing edge of a picture signal pulse and a delay device introducing a delay equal to the normal reset period of the retriggerable monostable device receptive of pulses derived from the leading edges of picture signal pulses, AND gate means which provides a SET output for a bistable device when a delayed leading edge signal is coincident with the unstable condition of the monostable device or a picture signal pulse and means for resetting the bistable device when the monostable device is in its reset (i.e. stable) condition and there is also no picture signal pulse present, the SET output signals of the bistable device constituting the gating pulses.

Since it is assumed that the second picture signal pulses applied to the gating pulse generating circuit means are produced in synchronism with the first picture signal, a compensating delay is required approximately equal to the normal reset period of the retriggerable monostable device to delay the first picture signals prior to their application to gating means controlled by the gating pulses from the bistable device of the circuit means, for gating the first picture signal pulses.

Where the first picture signal is an amplitude modulated video signal a delay line is required as the compensating delay device. Where however the first picture signal is a two value signal as a result of threshold detection of an amplitude modulated video signal, a shift register may be employed or any other suitable two value signal delay device employing for example monostable devices of appropriate reset periods.

It is to be understood that two or more of the techniques as hereinbefore described may be employed together. Thus by suitable selection for example on a grey level or colour basis, two or more second picture signals may be generated for different delineated regions and for example, one signal is employed to gate the first picture signal, a second to extend certain detected signal pulses obtained by threshold detection of the first picture signal to overcome a detection defficiency and a third to remove certain other detected signal pulses which have been generated by another detection defficiency.

Figure 2:
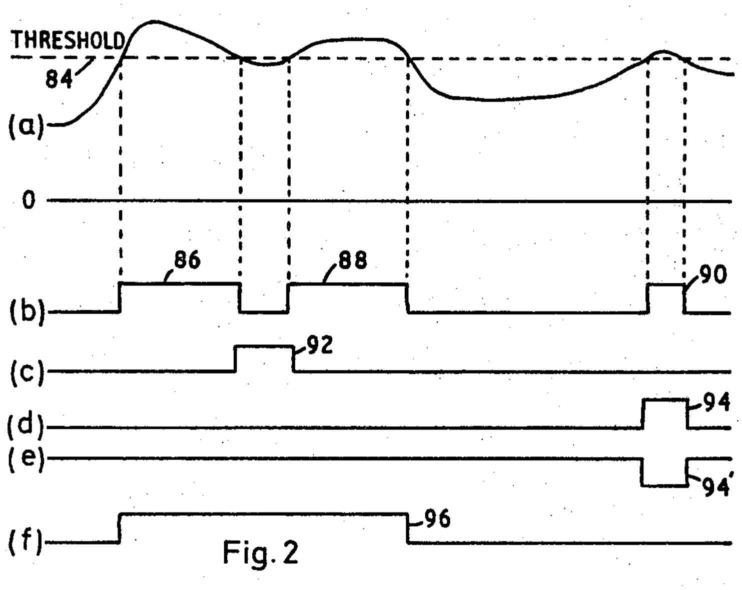
Figure 3:
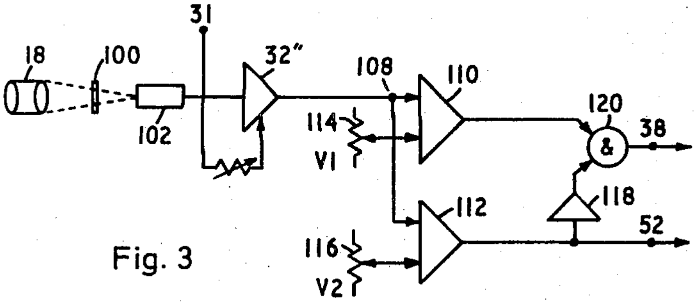
Figure 3A:
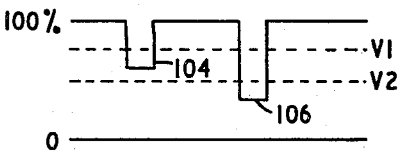
Figure 4A:
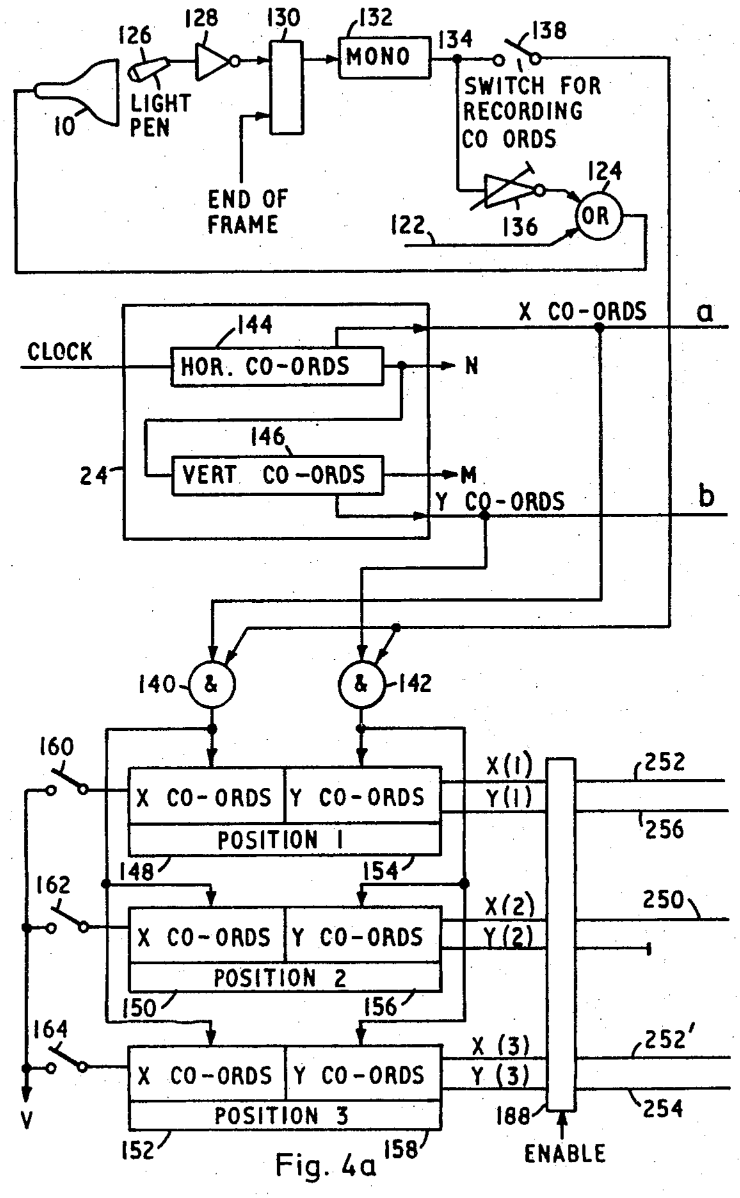
Figure 4B:
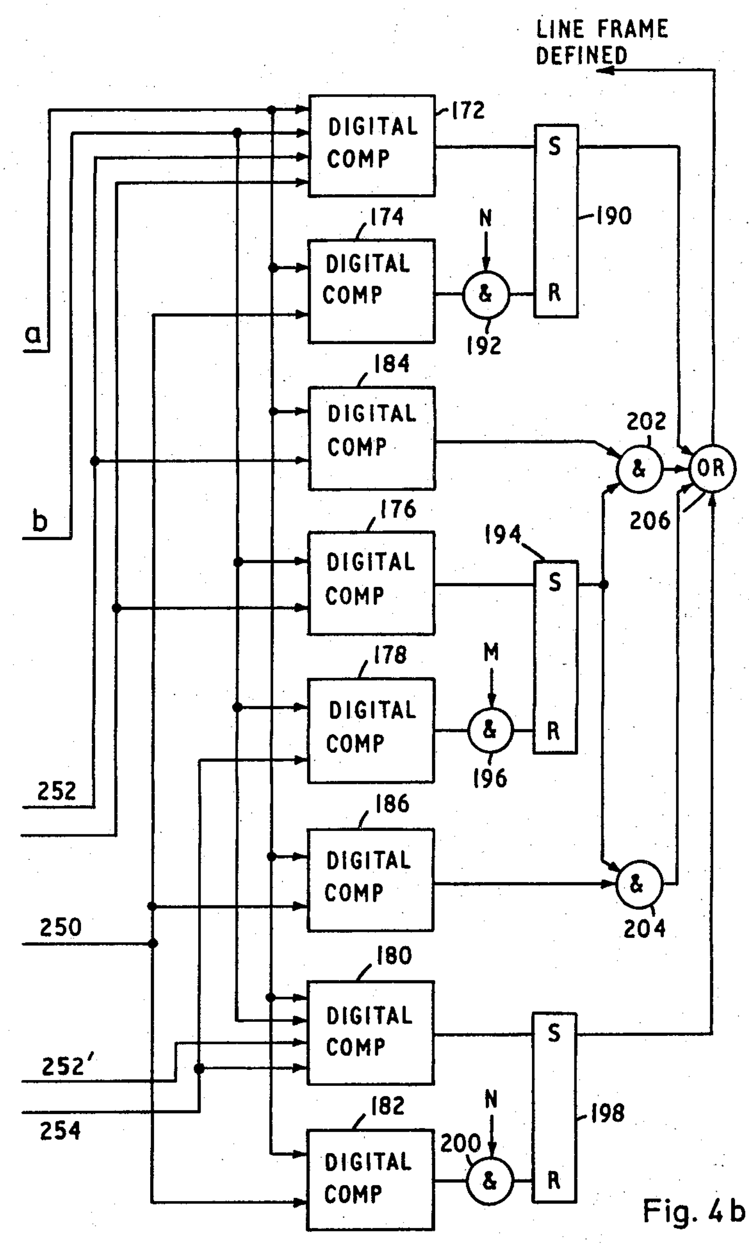
Figure 5:
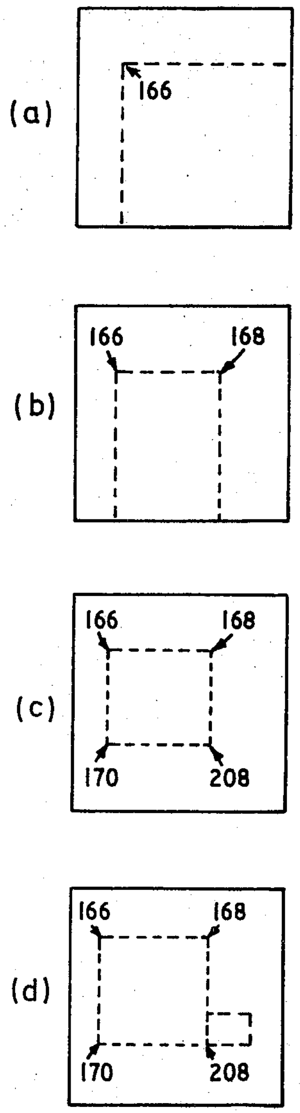
Figure 6:
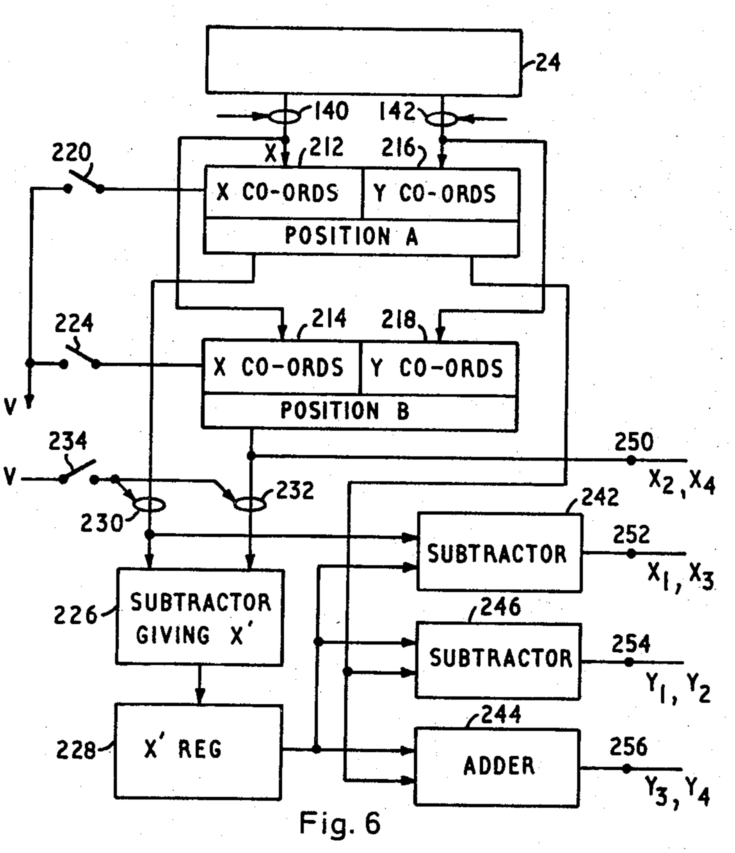
Figure 6A:
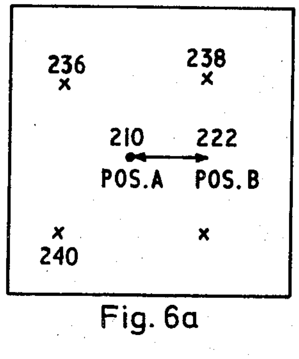
Figure 7:
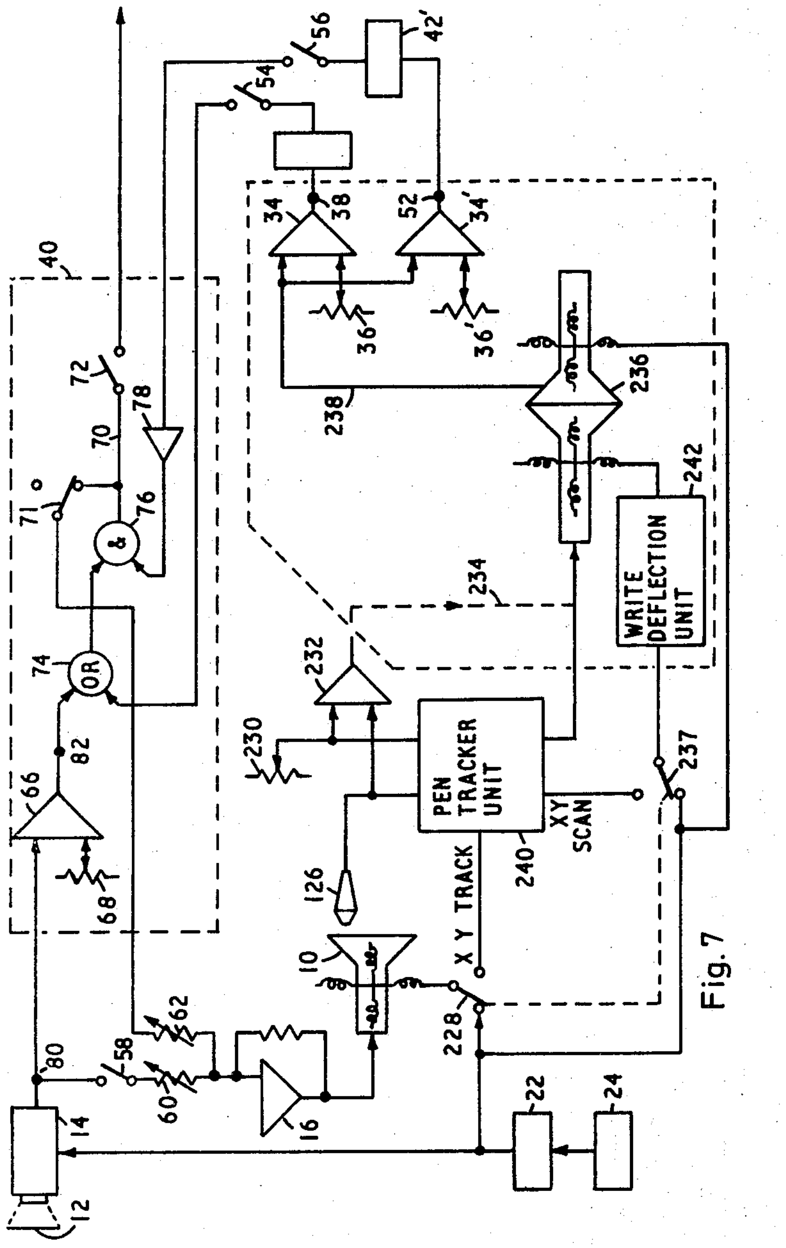
Figure 8:
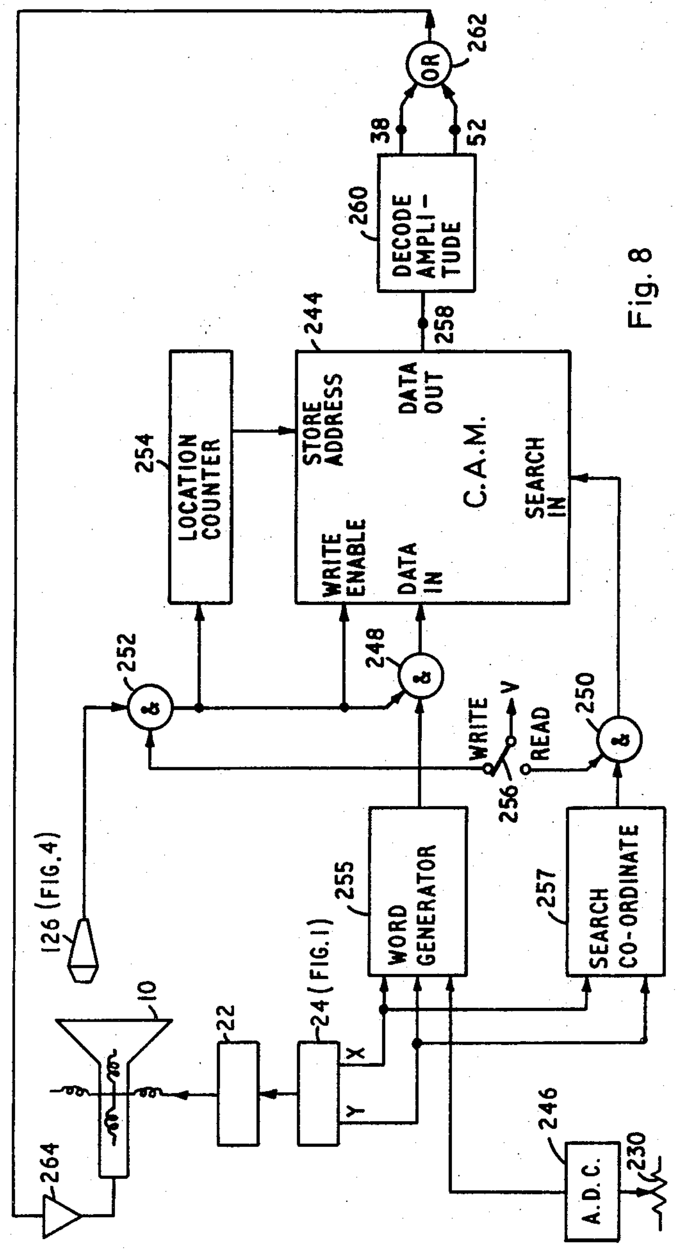
Figure 9:
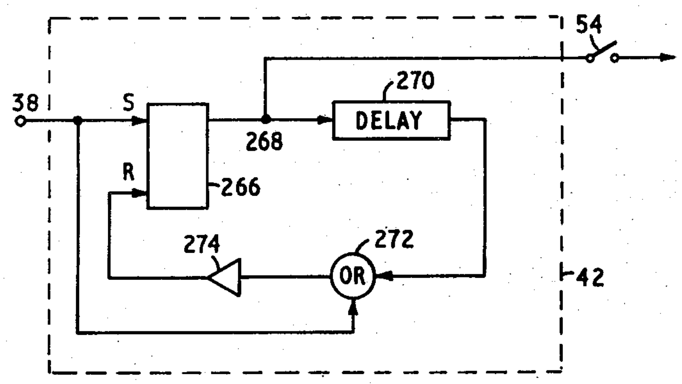
Figure 12:
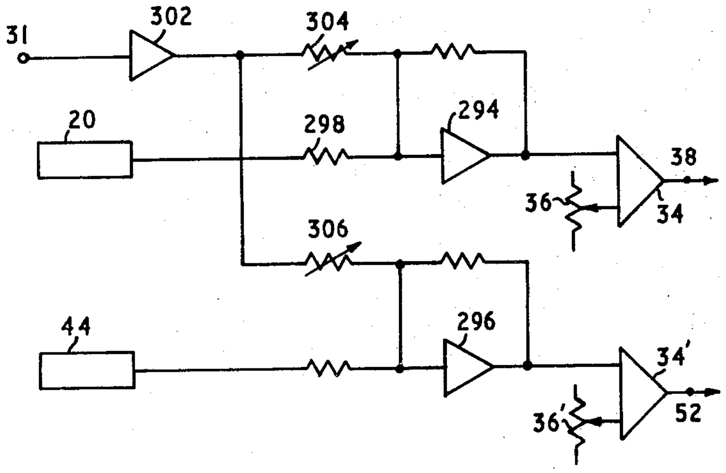
Figure 10:
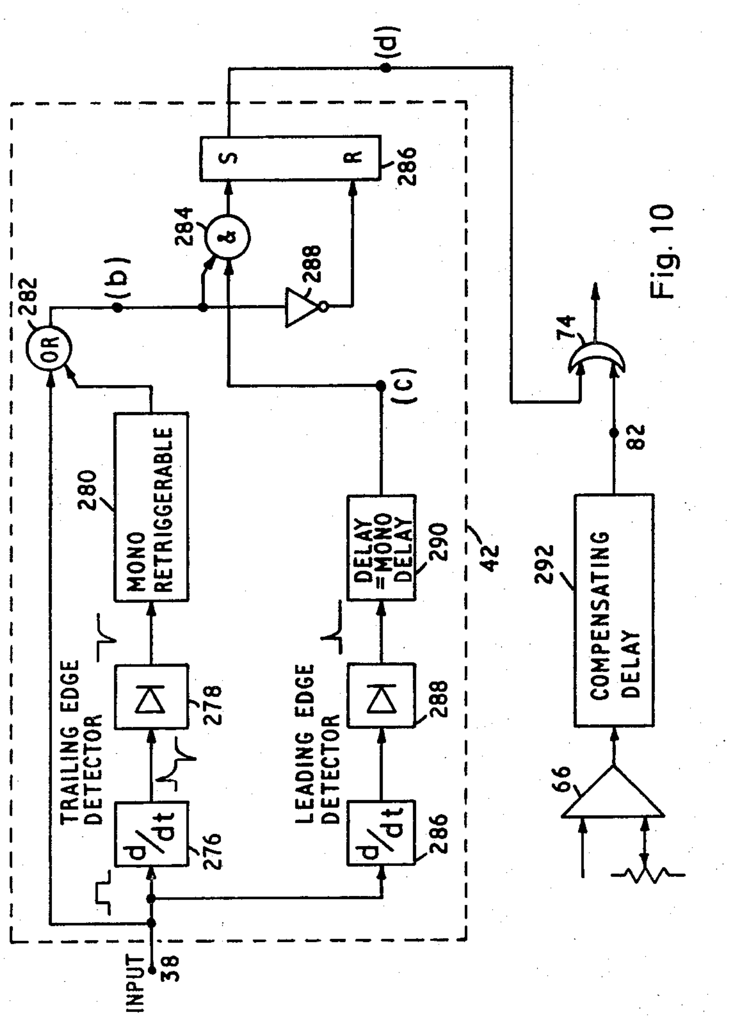
Figure 11:
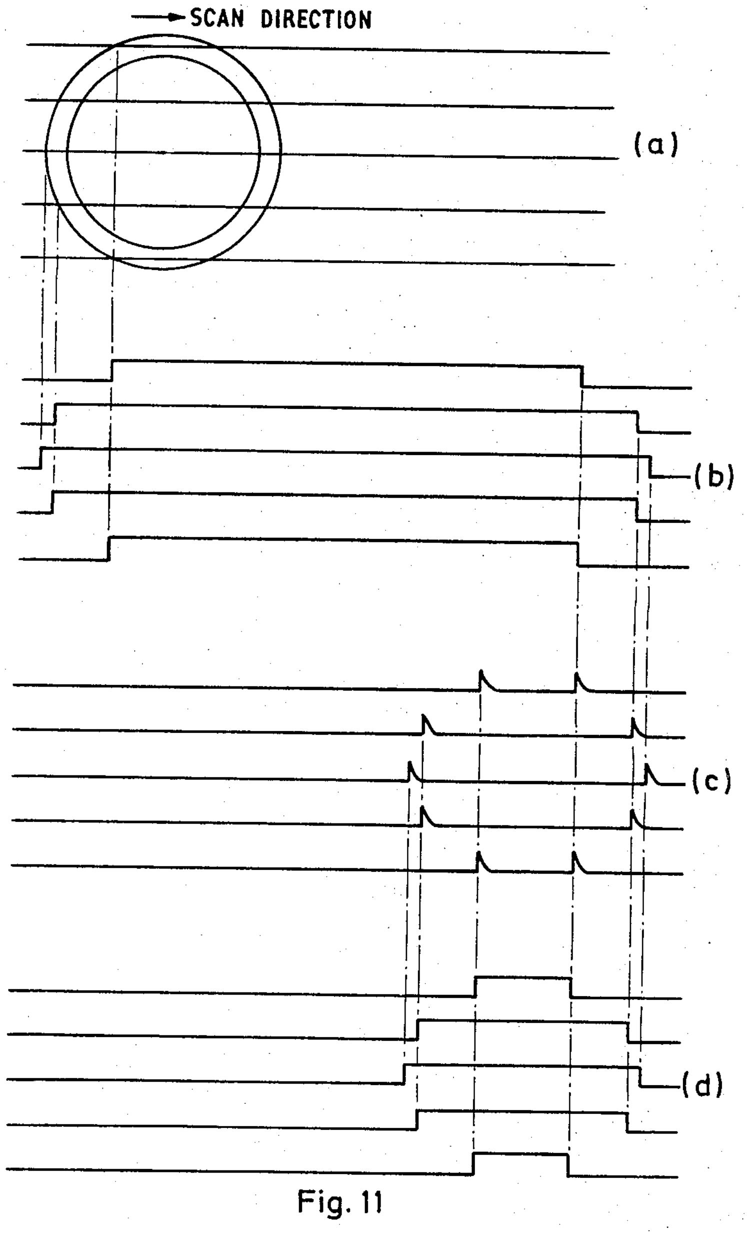
Figure 13:
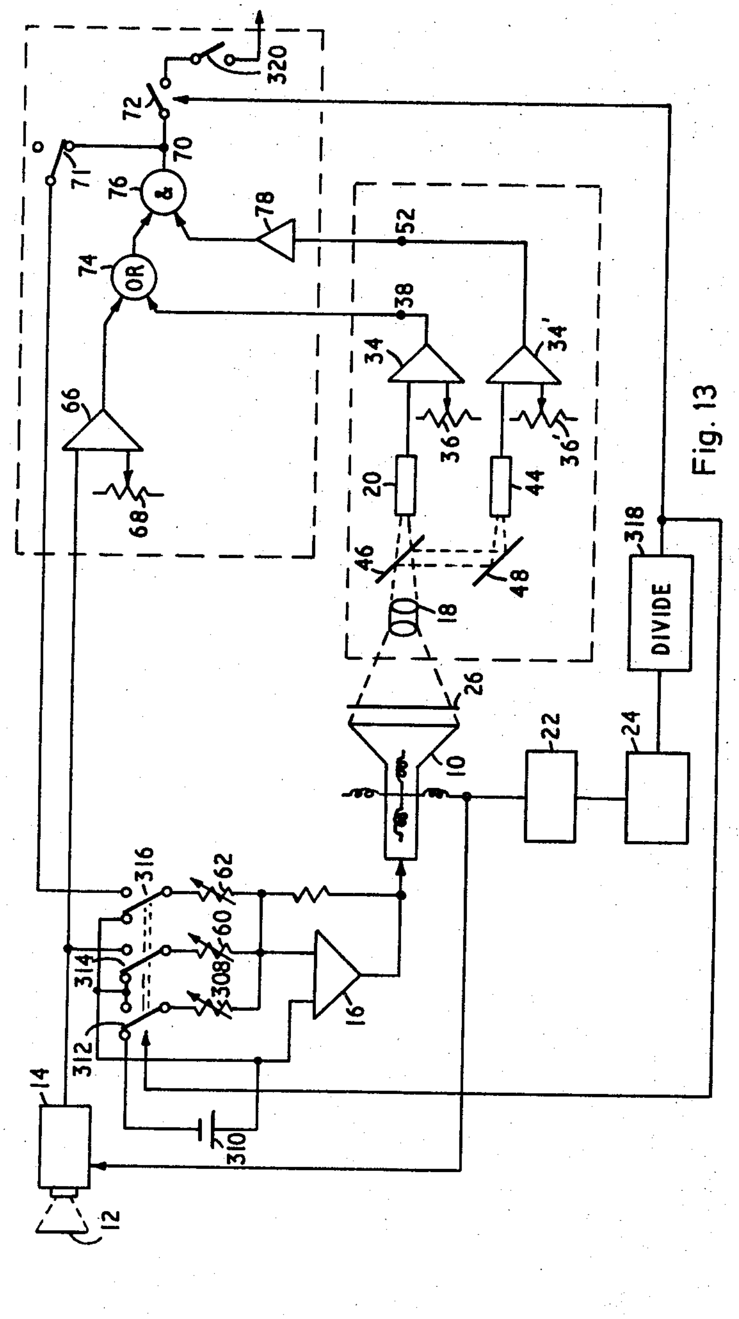
Figure 14:
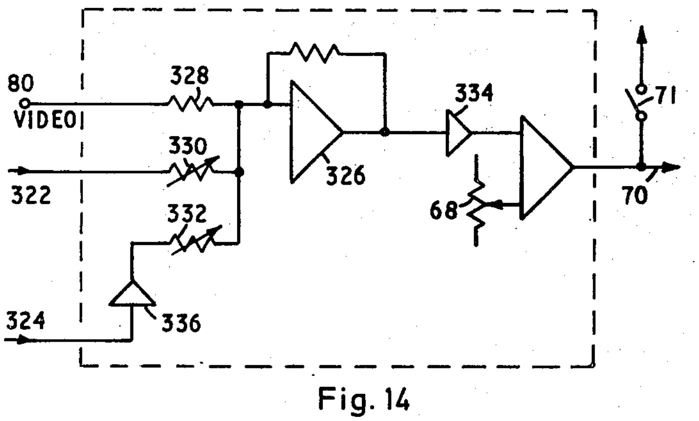
Figure 15:
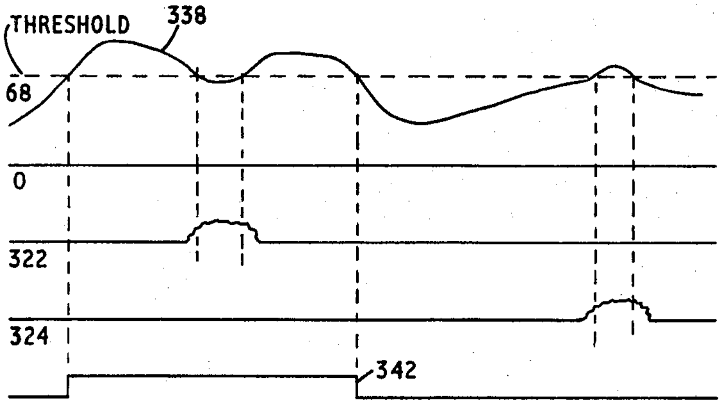
Figure 16:
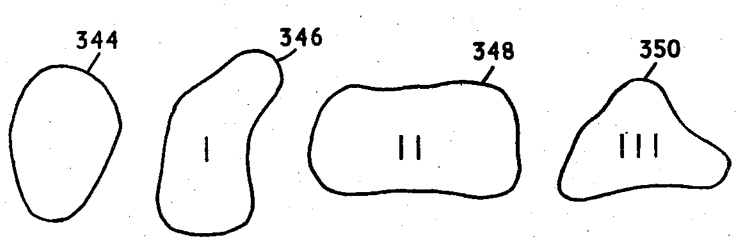
Figure 17:
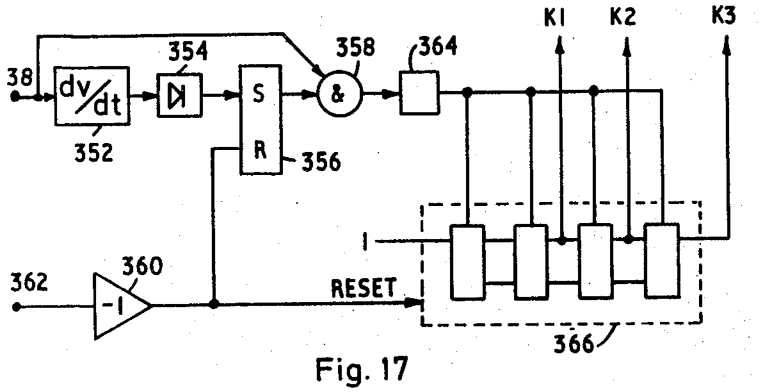
Figure 18A:
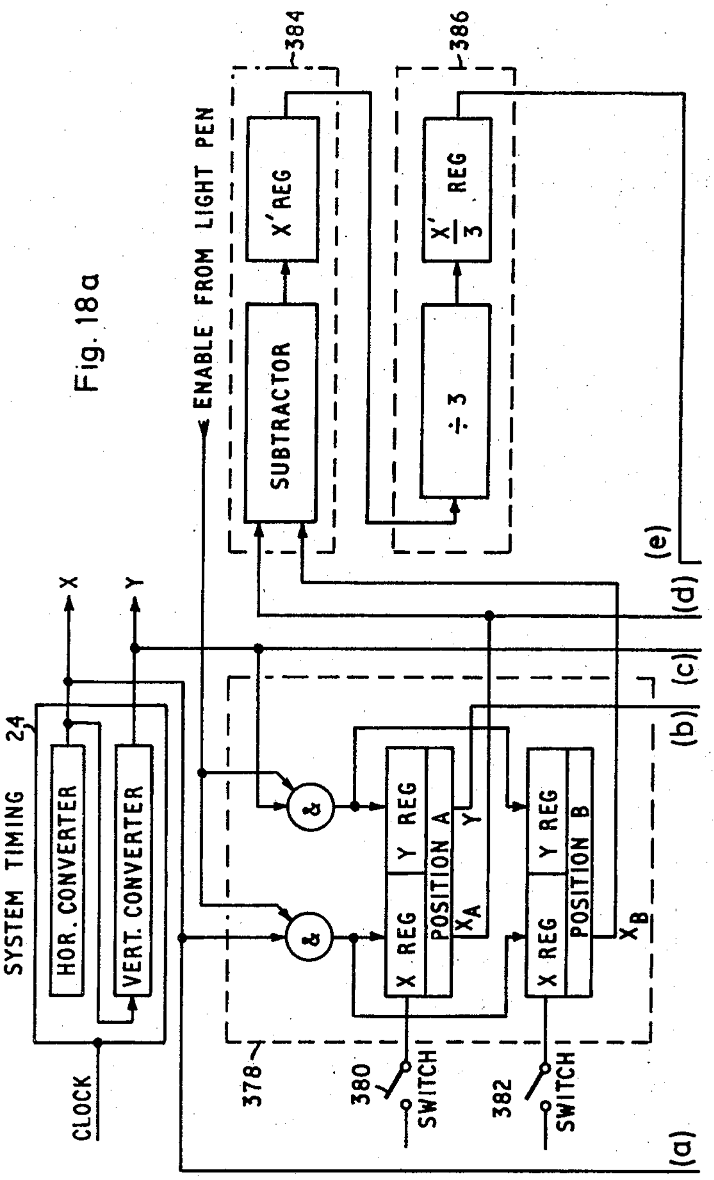
Figure 18B:
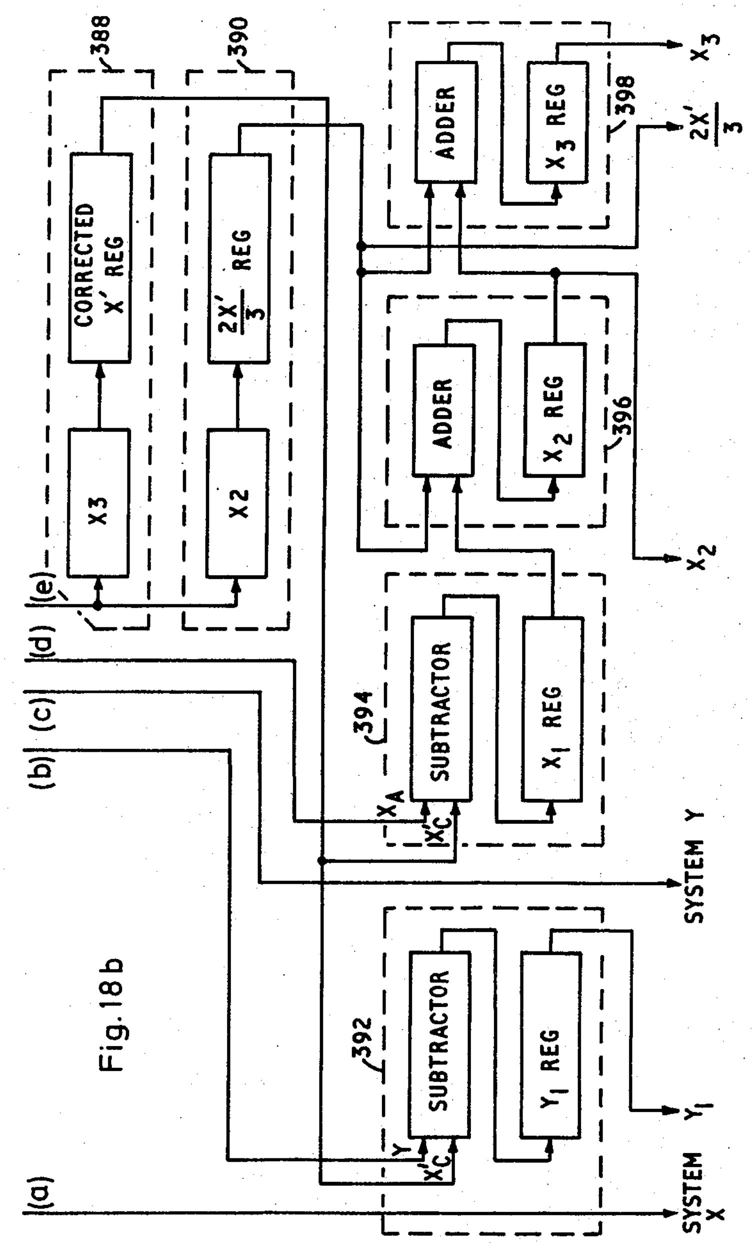
Figure 18C:
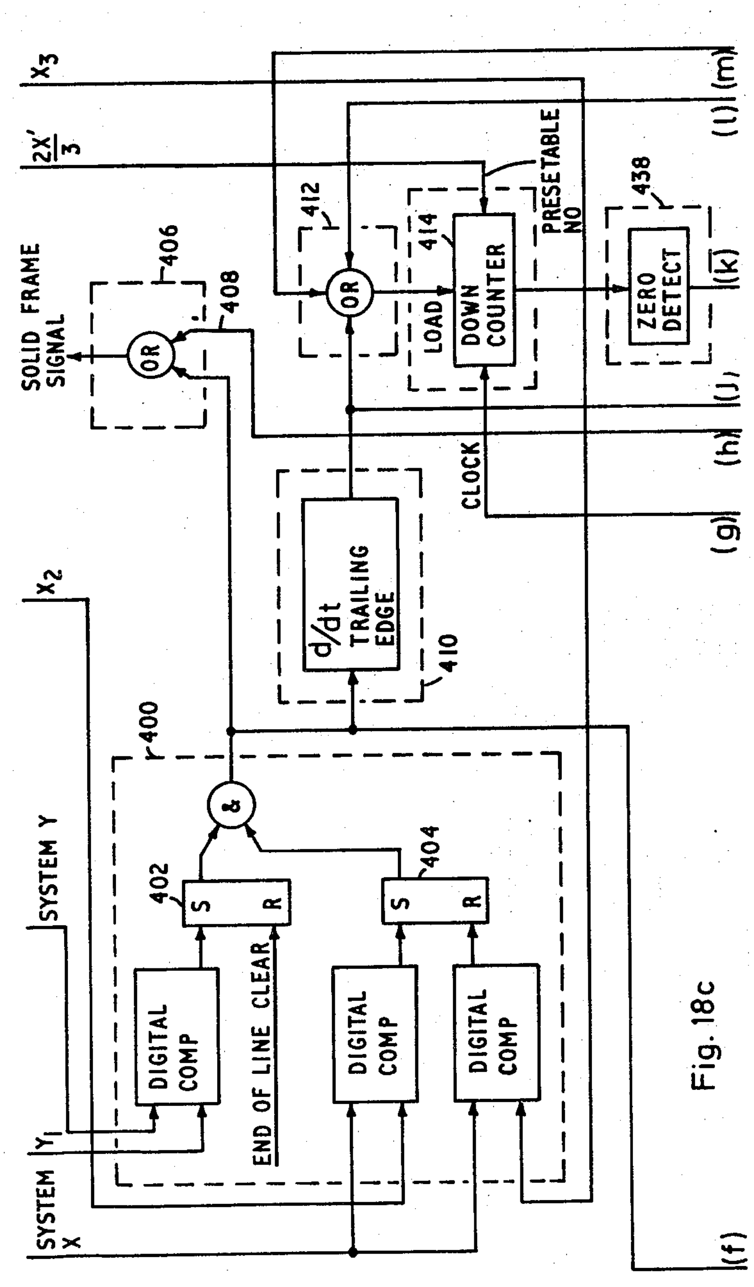
Figure 18D:
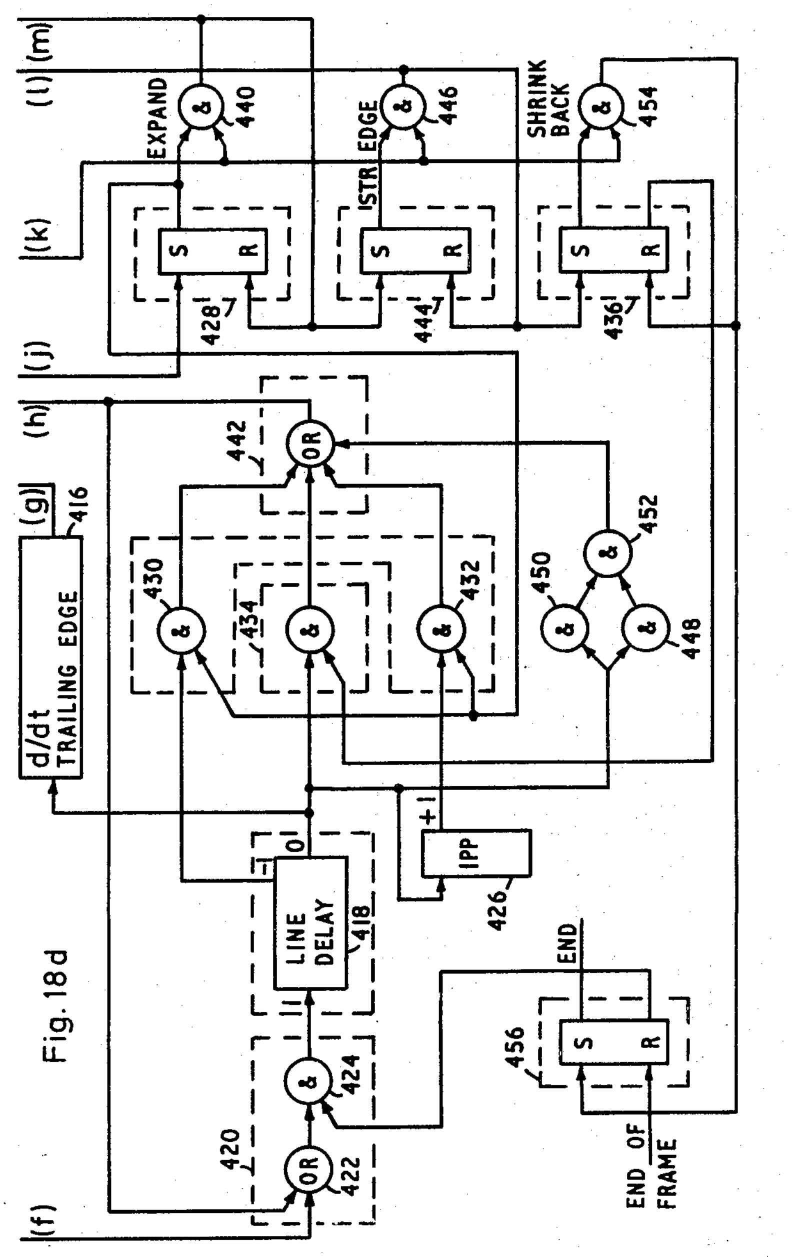
Figure 18E:
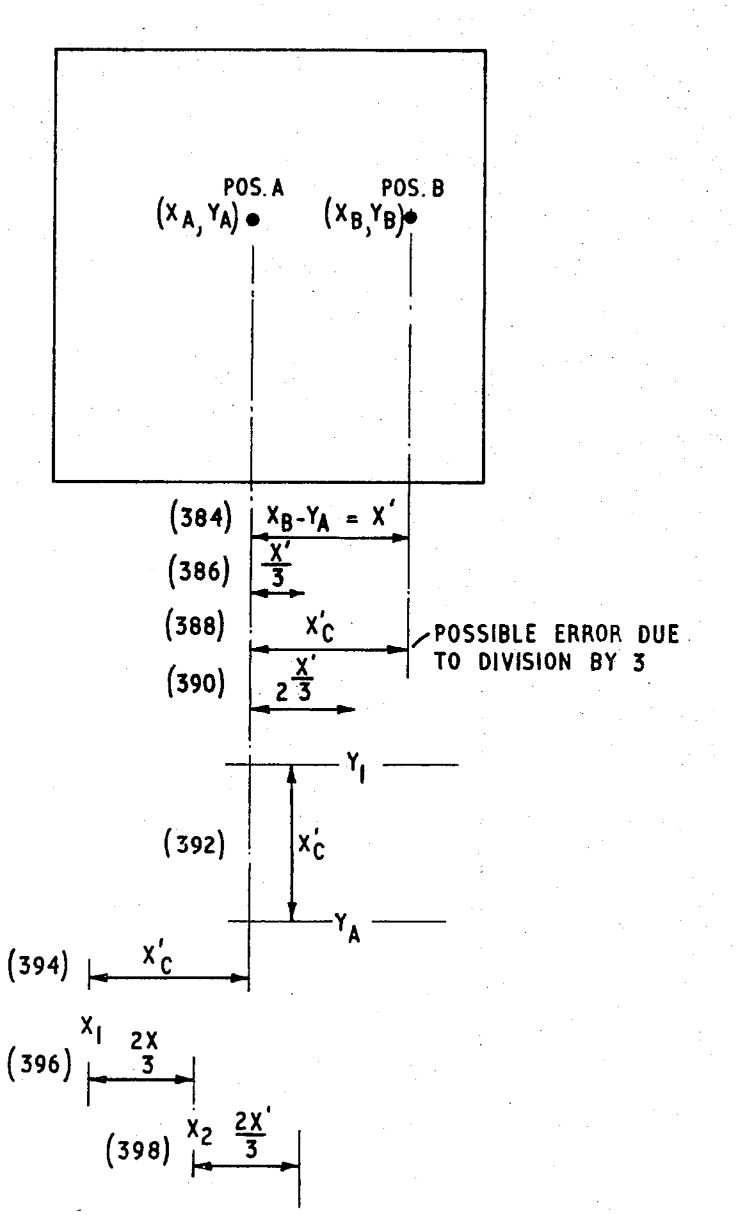
Figure 19:
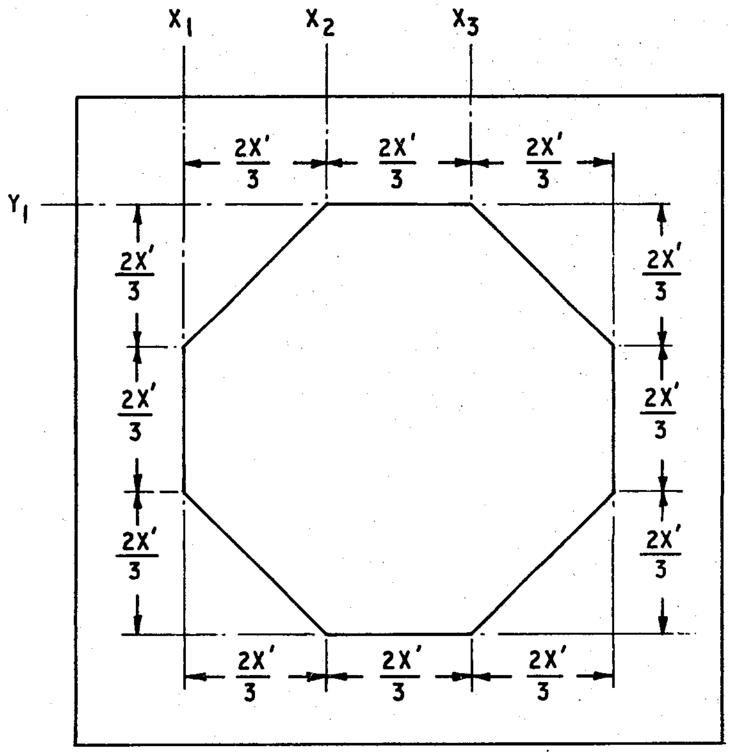
Figure 20:
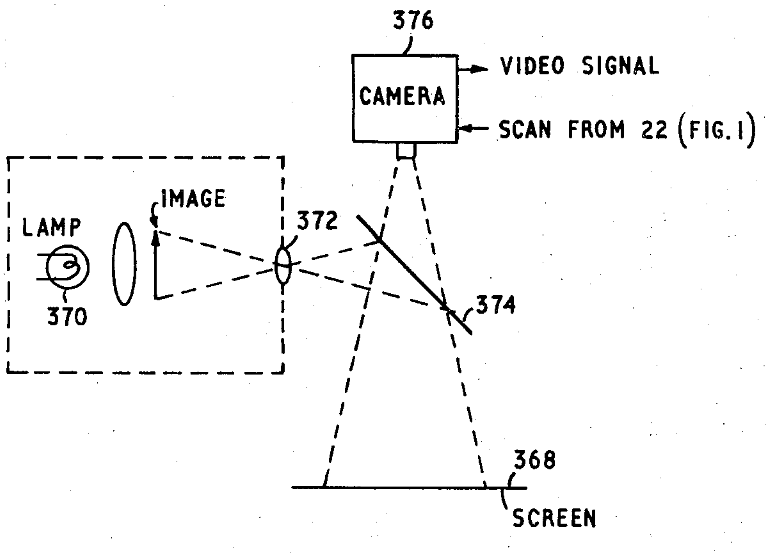

The invention will now be described by way of example with reference to the accompanying drawings in which:

FIG. 1 is a block circuit diagram illustrating part of an image analysis system employing a sketch pad, FIG. 2 illustrates graphically the wave forms of signals obtainable at certain points in the circuit of FIG. 1, FIG. 3 illustrates a modification which enables two picture signals to be obtained from a single photomultiplier in the circuit of FIG. 1, FIG. 3*a* shows a typical waveform, FIGS. 4*a* and 4*b* illustrate a modification in block circuit diagram form of part of the circuit of FIG. 1 in which a light pen is employed to delineate a trace on the C.R.T. of FIG. 1 and the trace co-ordinates are stored and used to generate gating signals comprising the second picture signal, FIG. 5 illustrates diagrammatically how a rectangular area is defined by means of three points selected by the light pen system of FIG. 4, FIG. 6 illustrates an alternative circuit arrangement for part of FIG. 4 which enables a square outline trace to be obtained from two points selected by the light pen, FIG. 6a illustrates a representative pattern for FIG. 6, FIG. 7 illustrates an alternative system for obtaining a picture signal corresponding to a desired point or series of points forming a locus, FIG. 8 is an alternative system also in block diagram form to that of FIG. 7, FIG. 9 is a block circuit diagram of a circuit arrangement for producing gating signal pulses from short duration pulses representing an outline signal thereby to produce pulses for filling in an area denoted by an outline, FIG. 10 is an alternative circuit arrangement to that of FIG. 9 also in block diagram form for producing gating signal pulses from outline signal pulses, FIG. 11 illustrates the principle of operation of FIG. 10, FIG. 12 is a block circuit diagram of a subtractive method of compensating for the field component in the second picture signal to that shown in FIG. 1, FIG. 13 illustrates modifications required to FIG. 1 to enable the system to be operated in a sequence mode whereby the representation of the field is removed from the C.R.T. during scanning of the delineations, FIG. 14 illustrates a further circuit modification to FIG. 1 for combining first and second picture signals, FIG. 15 illustrates graphically the effect of adding and subtracting picture signals by means of the circuit of FIG. 14, FIG. 16 illustrates how outline features delineated on a sketch pad surface can be coded so as to allow classification of picture signal information arising during scanning of the outline features, FIG. 17 is a block circuit diagram of a circuit arrangement by which signals derived from scanning classification markings such as those shown in FIG. 16 may be derived from the second picture signal obtained by scanning the delineations, FIGS. 18*a*, 18*b*, 18*c* and 18*d* are block circuit diagrams of a light pen delineation system for use in FIG. 1 for defining an octagonal region from two selected points, FIG. 18*e* shows the two starting points for defining the octagonal region of FIGS. 18*a* and 18*b*, FIG. 19 illustrates the octagonal region produced by the circuit of FIGS. 18*a* and 18*b* and, FIG. 20 illustrates an optical method of obtaining the representation of the field and delineating on the surface on which the image of the field is projected.

OVERALL SYSTEM

As shown in FIG. 1 the overall system includes a cathode ray tube 10 having a long decay phosphor and having supplied thereto the video signal obtained by scanning a field 12 by means of a camera 14, the video signal being supplied to the appropriate electrode of the C.R.T. 10 via a video amplifier 16 the input of which is adapted to receive more than one video signal for mixing purposes as hereinafter described.

Typically a low contrast but high brightness level reproduction of the image as seen by the camera 14 is reproduced on C.R.T. 10 and the image produced on the C.R.T. 10 is focussed by means of lens 18 onto a photomultiplier 20. The scanning spot of C.R.T. 10 and the photomultiplier 20 constitute a flying spot scanner and assuming uniform beam current and therefore uniform illumination of the C.R.T. display, the signal from the photomultiplier 20 will be of constant amplitude. Any opaque or semi opaque marks on the screen of the C.R.T. will cause blanking of the light at appropriate intervals in each frame scan causing the photomultiplier output voltage to drop as the marks are scanned. It is thus possible to obtain a video signal from photomultiplier 20 of any delineated marks on the screen of the C.R.T. 10 and the derived video signal from photomultiplier 10 will automatically be in synchronism with the line and frame scanning of the C.R.T. 10.

The camera 14 and C.R.T. 10 both derive their scanning deflection voltages from a common scan generator 22 which in turn is controlled by a master timing oscillator 24. Consequently the video signal from photomultiplier 20 will automatically be in phase and synchronism with the video signal output from camera 14.

The screen of the C.R.T. 10 thus provides a surface on which desired outlines or features may be delineated in any suitable ink or paint. Alternatively a suitable pencil or crayon may be employed. This assumes that the photomultiplier 20 is sensitive to visible light.

The delineation need not be on the actual face of the C.R.T. but may be on clear glass plate 26 positioned immediately in front of the C.R.T. screen. Alternatively any other suitable medium may be employed for the plate 26.

Alternatively and preferably the C.R.T. 10 is a so-called dual phosphor tube which produces visible light and also ultra violet light. The principle visible light producing phosphor is of the slow variety i.e. the visible light decays slowly whilst the secondary u.v. producing phosphor is a so-called fast phosphor i.e. it decays very quickly. The photomultiplier 14 is either selected as being sensitive only to the secondary phosphor emission i.e. sensitive to u.v. or alternatively a suitable filter 28 is interposed between the lens 18 and photomultiplier 20.

The output voltage of the photomultiplier 20 varies as described above, with the beam intensity of the C.R.T. 10 and also by the interposition of suitable marking on the C.R.T. tube or plate 26 which cuts off or reduces the u.v. radiation from the screen over selected regions thereof. Consequently where the dual phosphor tube is employed and the secondary emission is u.v., the delineation must be in an ink or paint or other medium which is u.v. absorbing but need not necessarily be visible light absorbing.

It will be appreciated at this stage that by using a material which according to the density of application will be more or less absorbing, so the picture signal obtainable from the photomultiplier 20 can be made to vary on a density basis and need not simply be a two value signal as is the case if the markings are only entirely opaque.

It will be noted that the use of a dual phosphor tube in which the photomultiplier is only sensitive to u.v. radiation overcomes the problem of ambient lighting variation which the simpler system is susceptible to i.e. in which the photomultiplier 20 is sensitive to visible light from a single phosphor tube 10 and the video signal from photomultiplier 20 is obtained by marking the tube screen or plate 26 with visible light absorbing material.

The variation of beam intensity of C.R.T. 10 is present all the time the video signal from camera 14 is applied thereto. To compensate for this variation (which will appear as a voltage variation in the output signal of photomultiplier 20) the signal from amplifier 16 is applied to a non linear amplifier 30 whose input/output characteristic is arranged to simulate the C.R.T. input/output characteristic and the output from the non linear amplifier 30 is applied as a gain control to a variable gain amplifier 32 which controls the amplitude of the video signal from photomultiplier 20. The relative signal levels are adjusted by means of suitable potentiometers etc., not referred to in detail so that the beam current variation component of the video signal from photomultiplier 20 is just compensated by the gain control variation provided by non linear amplifier 30.

The video signal from amplifier 32 is compared with a reference voltage in a comparator 34, the reference voltage being derived from a potentiometer 36. The output at junction 38 comprises a series of electrical pulses which appear only when the amplitude excursions of the video signal from amplifier 32 exceed the reference voltage from 36.

Assuming that the delineation on the C.R.T. 10 or plate 26 is in the form of an outline, the pulses at point 38 will only be short duration pulses and will only define the line and not the area defined by the outline. In some circumstances the actual pulses corresponding to the outline or line are required in which case they are applied direct to the circuitry contained in dotted outline 40. But more usually pulses corresponding to the area encompassed by the outline are required and to this end a pulse forming circuit 42 is provided for generating longer duration gating pulses from the short duration pulses defining the outline. Details of the circuit of item 42 will be given later.

Where different densities of light absorbing material are employed for the purpose of delineating different regions which it is required to electronically separate, a second photomultiplier 44 is provided and an optical arrangement such as a semi-reflecting mirror 46 and fully reflecting mirror 48 is provided to transmit some of the light and/or other radiation from the C.R.T. 10 to the second photomultiplier 44. Where a distinguishing radiation is employed a further filter 50 is employed to render the photomultiplier 44 sensitive to the appropriate wave length of radiation, the other filter 28 being chosen appropriately to render photomultiplier 20 sensitive to a different wave length radiation.

The output from photomultiplier 44 is compensated by a variable gain amplifier 32′ operating the same way as amplifier 32 and the compensated video signal amplitude excursions are compared with a second reference voltage from a second potentiometer 36′ by means of a comparator 34′ operating in the same way as comparator 34. The signal appearing at junction 52 will therefore correspond to that at junction 38 but will relate to delineations on the screen or plate which produce a radiation component having a wave length to which photomultiplier 44 is sensitive. The video signal at junction 52 will therefore be different from that at junction 38 and can be used either in a similar manner or in a complimentary manner as will hereinafter be described. Also as before the signal will comprise short duration pulses if the delineation is an outline and a second gating pulse forming circuit 42′ may be required to form suitable gating pulses from the signals at junction C in the event that pulses defining an area rather than an outline are required.

Switches 54 and 56 are conveniently provided to prevent the application of the signals from junctions 38 and 52 (via circuits 42 and 42′ or not) until the delineation on the screen or plate has been completed.

Although the representation normally required of the C.R.T. 10 is that of the video signal from camera 14 a further switch 58 is provided in the input to amplifier 16 whereby the video signal can be removed entirely from the C.R.T. 10. As previously mentioned the input circuit of amplifier 16 is provided with adding resistors 60 and 62 and the latter is supplied with the output of circuit block 4 which can be considered to comprise a modified detected signal. To this end the video signal from camera 14 is supplied via line 64 to one input of a comparator 66 for comparison with a reference voltage from a potentiometer 68 to supply constant amplitude pulses whenever the amplitude excursions of the camera video signal exceed the reference voltage. These pulses constitute the usual detected signal pulses which are supplied for example to the input terminal of an associated parameter computer such as described in our British Patent Specification No. 1,264,804 or related Specification 1,264,805 whereby measurements may be made on the electrical pulses to provide an electrical signal indicative of for example the area of detected features in the field. To this end an output line is shown identified as line 70 containing a switch 72 which is closed when the signal from circuit 40 is in a condition ready for analysis and computation by a computer such as previously described. Referring to FIG. 1 of our British Specification 1,264,804, the line 70 would be connected via switch 72 to junction 10 of that Figure.

Circuit 40 also includes an OR gate 74 to which the output pulses from detector 66 are supplied as one input and the signals from circuit 42 are supplied via switch 54 of the other input. The OR gate output is supplied to one input of an AND gate 76 the other input of which is supplied with the output of an inverting amplifier 78 the input of which is fed from circuit 42' via switch 56.

It will be seen that the action of the OR gate 74 will be to combine the pulse trains from the detectors 66 and 34.

The action of the AND gate 76 and inverting amplifier 78 is to remove from any detected signal pulses transmitted from detector 66 via OR gate 74 any portions coincident with detected signal pulses from junction 52 as modified by circuit 42' if provided. In this way it is possible to separate detected signal pulses from detector 66 which are otherwise merged together either due to deficiencies of the system or the optics or simply because two features touch in the field of view and the detected signal pulses relating thereto merge into one another. This is achieved by drawing a line or painting out the offending region with a suitable material on the C.R.T. 10 or plate 26 so that a signal is produced in photomultiplier 44 which is detected by detector 34'. In this connection circuit 42' is not required and the pulses from junction 52 are applied via switch 56 direct to the input of inverting amplifier 78.

The action of circuit 40 is illustrated graphically in FIG. 2 in which FIG. 2*a* illustrates a typical video signal wave form along a portion of one line scan from camera 14. This thus corresponds to video signal at junction 80.

FIG. 2*b* illustrates the detected signal pulses obtained at junction 82 in the output of detector 66.

The first amplitude excursion in FIG. 2*a* corresponds to a feature which is darker in the middle than it is on either side when viewed in the scanning direction. Consequently the amplitude drops in the centre region of the amplitude excursion and due noise spikes etc., the amplitude may drop below the threshold voltage shown by line 84 in FIG. 2*a* and corresponding to the voltage from potentiometer 68. Likewise the second amplitude excursion at the right hand end of the line scan extract, due to electrical noise just exceeds the threshold 84 so that in the first case the detected signal pulse corresponding to the first feature is split into two 86 and 88 respectively and in the second case the amplitude excursion produces a detected signal pulse 90 which should not be there.

By delineating on plate 26 a line or region in a material which produces a wave length to which photomultiplier 20 is sensitive, a pulse will be obtained at junction 38 each time the delineation is scanned. A typical pulse is shown at 92 in FIG. 2*c*.

The feature producing the second amplitude excursion in FIG. 2*a* is painted out by a material which produces a wave length to which photomultiplier 44 is sensitive so that a pulse is produced at junction 52 every time the second delineation is scanned. A typical pulse is shown at 94 in FIG. 2*d*.

Inverting amplifier 78 inverts the polarity of pulse 94 to produce 94' as shown in FIG. 2*e*.

The action of OR gate 74 is to add the signals shown in FIGS. 2*b* and 2*c* to produce the output pulse 96 shown in FIG. 2*f*. The action of AND gate 76 is to subtract the pulse 94' in FIG. 2*e* from pulse 90 in FIG. 2*b* to leave no detected signal pulse in the output signal at line 70.

It will be appreciated that although only two photomultipliers 20 and 44 have been shown any number of photomultipliers may be employed the only requirement being that the different materials used for delineation can be distinguished using filters or suitable selectively sensitive photomultipliers.

The signal at junction 80 is referred to as a first picture signal and the signals at junctions 38 and 52 as second picture signals. An alternative arrangement for use in place of the circuit contained within the dotted outline 98 is shown in FIG. 3. This alternative circuit also assumes two levels to thereby produce two second picture signals but it will be appreciated that any number of levels can be employed as will be hereinafter mentioned.

As shown in FIG. 3 the light passing through lens 18 and a filter 100 is supplied to a single photomultiplier 102 the output of which is compensated by means of a variable gain amplifier 32'' operating in the same way as amplifier 32 as described with reference to FIG. 1. The circuit of FIG. 3 operates to distinguish between different amplitude levels of the pulses produced in the photomultiplier output as delineated regions on the plate 26 are scanned. To this end, assuming photomultiplier 102 is sensitive to visible light, the darker the delineation the greater the amplitude excursion of the photomultiplier output. To this end if a region of the plate 26 is merely rendered grey a low amplitude excursion from the white level is produced as shown in FIG. 3*a* at 104 and a dense black delineation will produce a correspondingly larger amplitude excursion as shown at 106 in FIG. 3*a*.

The wave form in FIG. 3*a* is typical of the signal obtaining at junction 108 and this signal is applied to one input of two threshold detectors 110 and 112, the other inputs of which receive reference voltages V1 and V2 from potentiometers 114 and 116 respectively. Reference voltages V1 and V2 are denoted in dotted outline on the graphical wave form of FIG. 3*a*. Excursion 104 only exceeds reference voltage V1 (in the downward direction) whilst excursion 106 exceeds both reference V1 and V2 again in the downward direction.

An inverting amplifier 118 provides one input for an AND gate 120 the other input being derived from the detector 110. Thus when the output of detector 112 is at zero and the output of detector 110 goes to 1, a detected pulse appears at junction 38 which corresponds to junction 38 in FIG. 1 and in the event that the output of detector 112 goes to 1, a pulse appears at junction 52, the action of inverting amplifier 118 being to remove any corresponding pulse which would appear at junction 38 due to threshold V1 having been exeeded.

The signals at junctions 38 and 52 therefore correspond exactly with those obtained from the alternative circuit shown in FIG. 1 and the remainder of the FIG. 1 embodiment will operate identically as previously described.

LIGHT PEN DELINEATION SYSTEMS

FIG. 4 illustrates an alternative system for generating a picture signal which when displayed on the C.R.T. will produce an outline. Consequently FIG. 4 corresponds to a replacement of the circuit contained within box 98 of FIG. 1 between C.R.T. 10 and junction 38.

The video signal from amplifier 16 of FIG. 1 is applied to junction 122 in FIG. 4 and is supplied via OR gate 124 to the C.R.T. 10 which corresponds to the similarly referenced item in FIG. 1. A light pen 126 of the type described in our earlier British Patent Applications Nos. 12313/71 and 12751/71, or any equivalent light pen of conventional design, is provided for pointing towards the C.R.T. display. As described in the aforementioned Applications, an electrical pulse appears in the output of the light pen when the scanning spot enters the field of view of the light pen and this pulse is amplified in amplifier 128 to provide a set signal for a bistable 130. The set output triggers a monostable device 132 to provide a well defined electrical pulse at junction 134. This is amplified in an amplifier 136 having adjustable gain so as to provide via OR gate 124 a bright up signal for C.R.T. 10. The duration of the pulse is arranged to be such that the area on the screen which is brightened up is very small and defines on the screen a small point area.

In operation the light pen is moved until the brightened up spot on the screen is at the desired location at which time switch 138 is closed momentarily to transmit the next pulse from monostable 132 as an enabling signal to each of two AND gates 140 and 142.

The master timing system 24 includes a master oscillator (not shown) which provides so-called clock pulses to a first counter 144 of the overflow type which generates a count pulse for a second counter 146 each time the first counter is filled. The overflow output from counter 144 automatically resets counter 144 to zero. The capacity of counter 144 is made equal to the number of clock pulses received per line scan and that of counter 146 made equal to the number of line scans in the raster of camera 14 and C.R.T. 10.

The counters thus contain at any instant two numerical values which uniquely define one point in the scan raster and for convenience the numerical number in counter 144 will be referred to as the X co-ordinate of the point and that in counter 146 the Y co-ordinate of the point.

The enabling pulse to gate 140 casuses the X co-ordinate at that instant to be transmitted to each of three registers 148, 150 and 152 and likewise the enabling pulse for gate 142 transmits the Y co-ordinate to three registers 154, 156 and 158. The input to each of registers 148 and 154 is inhibited unless switch 160 is closed supplying an enabling signal to the input portion of the register and likewise for the other registers gates 162 and 164 must be closed before the X or Y co-ordinates can be transferred into the appropriate register.

Referring now to FIG. 5*a* the light pen 126 is first pointed at a point such as 166, switch 160 is closed and immediately thereafter switch 138 so that the X and Y co-ordinates of points 166 are stored in registers 148 and 154 respectively.

The light pen is then moved to point 168 (See FIG. 5*b*) and the procedure repeated except that this time switch 162 is closed instead of switch 160 thereby storing the X and Y co-ordinates at point 168 in registers 150 and 156 respectively.

The pen is moved yet again to point 170 (See FIG. 3*c*) and the procedure repeated yet again this time switch 164 being closed so that the X and Y co-ordinates of point 170 are stored in registers 152 and 158 respectively.

The running X co-ordinates from timing system 24 are applied to one input of each of six digital comparators 172, 174, 180, 182, 184 and 186 and the running Y co-ordinates to inputs of digital comparators 172, 176 178 and 180.

The register outputs are gated (diagrammatically shown by loop 188) and are only made available to other inputs of the digital comparators when an enable signal is applied to the gates. This signal is only applied after all the six registers are full i.e. when the co-ordinates of points 166, 168 and 170 have all been stored.

Digital comparators are well known to those skilled in the art and a typical device is that manufactured by Texas Instruments under type number 7485 IC.

The action of the digital comparators is as follows:

172 provides a set signal for a bistable device 190 when the running X and Y co-ordinates from 24 equal those stored in the registers 148 and 154.

174 provides a reset signal via OR gate 192 for bistable 190 when the running X co-ordinate equals the X co-ordinates stored in register 150.

176 provides a set signal for a bistable device 194 when the running Y co-ordinate from 24 equals that stored in register 154.

178 provides a reset signal for bistable 194 via OR gate 196 when the running Y co-ordinate equals that stored in register 158.

180 provides a set signal for a third bistable device 198 when the running X and Y co-ordinates from 24 equal those stored in registers 152 and 158 respectively.

182 provides a reset signal via OR gate 200 for bistable 198 when the running X co-ordinate equals that stored in register 150.

184 provides one input signal to an AND gate 202 when the running X co-ordinate from 24 equals that stored in register 148.

186 provides an input signal for a second AND gate 204 when the running X co-ordinate from 24 equals that stored in register 150.

The other input of each of AND gates 202 and 204 is supplied with the set output signal from bistable 194.

The set output of bistable 190 and bistable 198 are supplied to two inputs of an OR gate 206 while the outputs of AND gates 202 and 204 provide the other two input signals for OR gate 206. The output of OR gate 206 comprises a series of electrical pulses which if used to control the brightness of the scanning spot of C.R.T. 10 so as to increase the brightness of the spot, will produce a bright outline trace of rectangular shape the corners of which correspond to points 166, 168 and 170 and 208 of FIG. 2*c*.

In order to prevent overrun, a second input of each of OR gates 192 and 200 is supplied with the overflow signal pulse from counter 144 while the OR gate 196 is supplied with the overflow signal from counter 146. In this way bistables 190, 198 are reset at the end of each line irrespective as to whether or not a reset signal has been obtained from the appropriate comparator and bistable 194 is reset at the end of each frame irrespective as to whether or not an appropriate reset signal has been obtained from comparator 178.

It will be seen that the set output pulse from bistable 190 provides the bright up signal which occurs on a line scan between points 166 and 168, the output from AND gate 202 the short duration bright up pulse on each line scan between points 166 and 170, the output from AND gate 204 the corresponding short duration bright up pulses for the line between points 168 and point 208 and lastly the set output of bistable 198, the bright up pulse for a line scan between point 170 and point 208.

By providing a duplicate system of AND gates 140, 142, registers, comparators and an OR gate 206 (not shown) a further set of co-ordinates can be stored simultaneously. These may define an area totally remote from the area defined by the co-ordinates in the first set of registers or, as shown in FIG. **5*d* may define an area immediately adjacent to that defined by the previously stored co-ordinate values. It will be appreciated that a number of systems such as this can be added in parallel and the outputs from the respective OR gates combined to produce any number of separate traces on the C.R.T. screen. Thus each additional set of registers and comparators etc., corresponds to a second photomultiplier such as 44 in FIG. 1 and the associated circuitry ending in an output signal junction 52.** However it will be seen that only one light pen will be required although a series of switches will be necessary to select the various parallel systems.

It will be seen that it is not necessary to fill all the registers and if only a single line or two lines are required only the appropriate co-ordinates are stored although it is important to use registers 148 and 154 for the left hand co-ordinate of a horizontal line and registers 150 and 156 for the co-ordinates of the right hand end of the line. Likewise the first two registers must be used for the upper end of a vertical trace and the registers 152 and 158 for the co-ordinates of the lower end of a trace.

The output signals from OR gate 206 can be used directly to modify or gate the video signal output from camera 14 or the output of a threshold detector such as 66 to which the video signal is supplied.

Alternatively the outline defining pulses may be used to generate gating pulses in a circuit such as 42 (hereinafter described in more detail) so as to define an area, the gating pulses enabling the video signal or detected video signal to pass only within the defined area or outside the defined area.

FIG. 6 illustrates an alternative system which may be used with the system control 24 and registers 148 to 158 and remaining circuitry of FIG. 4. This alternative circuit of FIG. 6 enables a square outline to be defined from a first point defining the centre of the square and a second point lying on one of the sides of the square.

Referring to FIG. **6*a* the light pen of FIG. 4 is pointed first to point 210 which is selected as the centre of the square. The running X and Y co-ordinates from timing control system 24 are selected by an enable signal from the light pen via AND gates 140 and 142 (see FIG. 4) and applied to registers 212 and 214 and 216 and 218 respectively. Switch 220 is closed when the co-ordinates for point 210 are to be stored thereby enabling the input circuits of registers 212 and 216 to receive the X and Y co-ordinates of point 210. (As before described point 210** will be brightly illuminated on the C.R.T. screen).

The light pen is moved to a second point 222, this latter point being chosen in the knowledge that it lies on the right hand vertical edge of a square which will be sent at a point 210. After selecting point 222, switch 224 is closed to enable the input condition of registers 214, 218 to receive the X and Y co-ordinates on the next enable pulse from the light pen to store the co-ordinates in registers 214 and 218.

The X co-ordinate values stored in registers 212 and 214 are applied to a digital subtractor 226 the difference output of which is entered into a further register 228. AND gates 230 and 232 enabled only when a further switch 234 is closed to supply an enabling voltage thereto prevent the application of the X co-ordinates from registers 212 and 214 to the subtractor 226 until the desired point in the generation of the outline trace.

The X and Y co-ordinates for points 236, 238 and 240 are obtained as follows:

The X co-ordinate of points 236 and 240 is obtained by subtracting the number in register 228 from the X co-ordinate stored in register 212 by means of a subtracting stage 242.

The X co-ordinate of point 238 is the same as that of point 222 and is therefore the X co-ordinate value stored in register 214.

The Y co-ordinate of point 236 and also point 238 is obtained by subtracting the numerical value in register 228 from the Y co-ordinates stored in register 216 by means of a numerical subtractor 246.

The Y co-ordinate of point 240 is obtained by adding the numerical value in register 228 to the Y co-ordinate value stored in register 216 by means of a numerical adder 244.

Junction 250 thus corresponds to junction 250 in FIG. 4, junction 252 is equal to the junction 252 (and also junction 252') in FIG. 4, junction 254 to junction 254 in FIG. 4 and junction 256 is equal to junction 256 in FIG. 4. In consequence the remainder of the system of FIG. 6 is not shown since it is identical to FIG. 4.

ALTERNATIVE DEVICES FOR DELINEATING REGIONS

FIG. 7 illustrates an alternative sketch pad system employing a Light pen in which the "memory" for storing the co-ordinate information from which a trace signal can be generated and from which modifying or gating signals can be produced for modifying or gating the video signal or detected video signal from camera 14, comprises a scan - conversion storage tube. In such a tube, data is written in the form of a charge image onto a target via a first electron beam and the same image is read from the other side of the target via a second scanning electron beam. Parts of the system of FIG. 7 are similiar to those shown in FIG. 1 and similar reference numerals have been used where appropriate and these items have not been described.

In FIG. 7, camera 14 supplies the video signal to detector 66 and to C.R.T. 10 which as described with reference to FIG. 1 has a dual phosphor, the fast component of which produces radiation to which a light pen 126 is sensitive. C.R.T. 10 is scanned in synchronism with camera 14 (i.e. with switch 128 in the position as shown in FIG. 7) and for every frame scan, one precise point in the C.R.T. display will produce a pulse in the output of the light pen 126. This type of arrangement has already been described with reference to FIG. 4.

The signal so obtained is combined with a DC voltage set by a potentiometer 230 by means of a summing amplifier 232 the output of which is supplied via a connection 234 shown dotted in FIG. 7 to the modulating input of the writing beam of scan conversion tube 236. The writing and reading beams of scan conversion tube 236 are operated in synchronism with the C.R.T. 10 by means of signals from the scan generator 22 thus requiring switch 237 to be in the position shown in FIG. 7.

One point is selected during each of a succession of frame scans and stored in the memory of the scan conversion tube 236. The light pen 126 is moved until all the points defining the desired outline have been stored in the tube 236. The output of the reading beam in the outer half of the tube 236 is applied along line 238 to the inputs of comparators 34, 34' etc., previously described.

It will be appreciated that the process of building up the trace signal point by point is slow and laborious and the circuit of FIG. 7 contains further modifications which are operable to speed up the writing of the information into tube 236. To this a pen tracker unit 240 and a write deflection unit 242 are provided the X, Y co-ordinates generated by the pen tracker unit being supplied via switch 228 to the deflection coils of C.R.T. 10 and to the write deflection unit and from there to the deflection coils of the writing beam of tube 236, when switches 228 and 237 occupy the opposite positions shown in FIG. 7. In operation the switches 228 and 237 are changed at the end of each frame scan so that the C.R.T. 10 and tube 236 writing beam operate alternately in a normal scanning mode followed by a tracking mode. The pen tracker unit 240 provides a further path to the brightness control electrode of the writing beam portion of tube 236, the brightness being controlled by the voltage of potentiometer 230. In the modified arrangement, amplifier 232 and connection 234 are not required.

During the alternate scans when switches 228 and 237 connect the pen tracker unit to the C.R.T. 10 and write deflection unit 242, the pen tracker unit supplies the appropriate X and Y co-ordinates corresponding to the last pen location and the writing beam of tube 236 is deflected by this information after which the appropriate brightness voltage is applied to the brightness control electrode. A pen tracker unit and light deflection unit such as illustrated and described is well known to those skilled in the art.

It will be seen that various levels of intensity can be written into the memory of tube 236 by adjustment of potentiometer 230. Accordingly a first trace outline can be written in at one intensity, a second trace outline can be written in at another intensity and so on. The different trace intensities will provide different amplitudes of read signal along line 238 and the different intensities can be distinguished by means of the differeing thresholds set by potentiometers 36, 36' etc., of detectors 34, 34', etc.

The information stored in the tube 236 is of course read by the reading beam in a normal scanning mode driven from the scan generator 22.

As a further alternative the light pen and tracker unit can be replaced by a so-called graphics X, Y tablet, a so-called joy stick or a so-called tracker-ball X, Y co-ordinate generator. Each of these devices is well known to those skilled in the art and each provides X, Y co-ordinates of the selected position which using suitable interfacing equipment can be applied directly to the light deflection unit 242 and deflection coils of C.R.T. 10. As before the intensity of the writing beam is controlled by the setting of potentiometer 230 and therefore multi-level writing in of information is still possible.

An alternative system for generating the electrical signal corresponding to a delineation is shown in FIG. 8. This system involves the use of a content addressable memory (CAM) of the type marketed by Signetics Inc. and others, together with a light pen 126 as shown in FIG. 4, together with associated circuitry (not shown in detail in FIG. 8) whereby a short duration pulse is generated during each frame scan on C.R.T. 10 corresponding in time within the scan raster to the time at which the point seen by the light pen 126 is scanned by the scanning beam of C.R.T. 10.

The pulse produced by the light pen circuitry is applied to an AND gate 252 together with (in the writing-in-mode), an enabling voltage V via a switch 256. The output pulse from AND gate 252 steps the location counter 254 to select the next store location in the content addressable memory 244.

This output pulse also enables AND gate 248 to allow the output from the word generator 255 to be applied to the data input of the CAM 244. The word generator 255 is supplied with the running X, Y co-ordinate signals from timing circuit 24 (as described with reference to FIG. 4), together with a digital signal from analogue to digital converter 246 representing a selected amplitude level set by potentiometer 230.

The output signal AND gate 252 also provides an enabling signal for the WRITE enable terminal of CAM 244.

During a frame scan, with the system in its writing-in-mode, a word from 255 is inserted into an appropriate one of the CAM store locations, in response to the light pen pulse occurring during the frame scan.

The running X, Y co-ordinate signals are also supplied to a search co-ordinate decoder 257, the digital output of which constitutes one input to AND gate 250, the output of which is applied to the search input terminal of CAM 244. An enabling signal for AND gate 250, is obtained from voltage source V, when switch 256 is in the READ position.

During a frame scan when the system is in a reading-out-mode, an output signal appears on line 258 at each instant during the frame scan when the running X, Y co-ordinate information of a word in any one of the store locations. The output signal is of course the digital word stored in the store location and a digital to analogue converter or alternative decoding device 260 is provided whereby an analogue version of the non X, Y portion of each stored word is obtained — i.e. the digital value of the setting of the potentiometer 230 for the particular X, Y co-ordinates. Preferably the decoded values appear on two or more output level lines.

In order to indicate the precise outline which has been drawn by the light pen, the outputs of decoder 260 are combined by means of an OR gate 262 and supplied as an input signal to an amplifier 264 the gain of which is adjusted to produce in its output, signal pulses suitable for producing a brightening of the scanning spot in C.R.T. 10.

In operation therefore the memory 244 is first cleared and potentiometer 230 is adjusted to give a particular brightness level signal. Switch 256 is rapidly changed from the WRITE to the READ position during successive frame scans, so that the system changes from mode to the other at the end of each frame scan period. The light pen 126 is moved relative to the C.R.T. 10 so as to slowly describe the outline required. The signal appearing in the output of OR gate 262 causes the scanning spot to brighten up at those points which have been "seen " by the light pen 126 during the read-out-mode frame scan so that the outline appears as a bright line which apparently follows the pen around the screen of the C.R.T. 10.

If it is required to delineate a second outline having a different brightness level the potentiometer 230 is adjusted to give the appropriate brightness level signal, and the pen 126 moved relative to the C.R.T. 10 so as to describe the second desired outline. The circuit operates in exactly the same way as previously, the new higher or lower level brightness signal being stored at each of the appropriate store locations in the memory 244 and being read out in synchronism with the running X, Y co-ordinates from system 24 so as to produce along side the first bright outline, the second bright outline.

Preferably the potentiometer 230 is arranged to deliver a number of discreet voltage levels which can then be represented by a series of digital numbers to simplify decoding.

The separate outputs from decoder 260 correspond to the pulses obtainable at junctions 38 and 52 for example in FIG. 7. Accordingly the remainder of the system can be as shown in FIG. 7 and is not repeated in FIG. 8.

GENERATION OF GATING PULSES FROM OUTLINE PULSES

FIG. 9 illustrates one possible circuit arrangement for the circuit 42 or 42' referred to inter alia in FIG. 1. To this end the input to the circuit is denoted 38 and the output is shown connected to a gate 54 as in FIG. 1.

It is assumed the detected signal pulses applied to Junction 38 have one of two values depending on whether the amplitude excursion of the video signal exceeds or is below the threshold voltage of the Detector 34. For simplicity it is assumed that a line scan intersection with a segment of delineation produces an averaged excursion in the video signal applied to Detector 34 sufficient to exceed the reference voltage from potentiometer 36 so that a 1-value obtains in injunction 38 for a short time corresponding to each line scan intersection, with the outline delineated on the sketch pad surface. The zero value will obtain at junction 38 at all other times.

A bi-stable device 266 is set by a 1-value signal at junction 38. The set output of bi-stable 266 appears at junction 268 which constitutes the output terminal of the circuit 42 and to this end is connected to the Gate 54 as described in relation to FIG. 1. The output signals at junction 268 are also applied to a delay device 270 and since the signals will only be 2-value signals this may conveniently comprise a shift register. The output of delay 270 is supplied to an OR Gate 272, the other input of which is supplied with the input signal from junction 38.

The output of OR Gate 272 comprises the input signal to an inverting amplifier 274 which produces a reset signal for bi-stable 266 in the event that a zero signal condition obtains at both inputs of OR Gate 272.

The time delay introduced by Delay 270 is of the order of 1 line scan period, so that during the first line scan intersection with a feature when, usually there will only be one detected signal pulse generated, the bi-stable device 266 will be set by the leading edge of the detected signal pulse and will be reset as soon as the pulse terminates, since it is assumed that there is no signal appearing at the output of Delay 270 when the end of the detected signal pulse at junction 38 arrives.

However, the set output condition of bi-stable 266 has generated a signal pulse which is entered into the Delay 270 and on the next line scan this pulse appears at the input to OR Gate 272. All the time that this pulse is in existence, inverting amplifier 274 cannot produce a reset signal for bi-stable 266, thereby producing a longer set output condition on the next and subsequent line scans, depending on the shape of the feature. In consequence on succeeding line scans the bi-stable device 266 is set by the leading edge of the first detected signal pulse obtained on a line scan which intersects the left hand boundary of the outline feature and will be reset only after the end of the second detected signal pulse obtained as the line scan intersects the right hand boundary of the outline.

The set output of bi-stable 266 thus constitues the series of gating pulses required. It will be appreciated that the trailing edge of the set output pulses will not follow the trailing edge of an outline feature if the latter is other than vertical or advances in the direction of line scan on succeeding line scans. This is because the signal from Delay 270 is delayed by 1 line scan period. By making the delay line a short increment of time less than 1 line scan period, the duration of the set output pulses of bi-stable 266 can be reduced on those line scans where the trailing edge of the detected signal pulse obtained from the right hand boundary of the outline occurs at a relative position along the line earlier than that of the trailing edge of the corresponding pulse and the previous line scan.

An alternative circuit for generating gating pulses is shown in FIG. 10. As before the circuit corresponds to that of circuit 42 referred to in FIG. 1, and the input and output have been denoted in the same way as in FIG. 9.

The alternative circuit comprises a differentiating circuit 276 and rectifying circuit 278 for producing a short duration pulse at the trailing edge of each detected signal applied to junction 38. Each trailing edge pulse so generated is applied to the trigger terminal of a so-called retriggerable mono stable device 280. Such a device has a normal relaxation period which is initiated by the appearance of a trailing edge pulse. In the event that a subsequent trailing edge pulse is received before the normal relaxation period has ended, a mono stable device 280 is retriggered and the normal relaxation period is started all over again with respect to the subsequently received trailing edge pulse.

The output of mono stable 280 provides one input to an OR Gate 282, the other input of which is supplied with the detected signal pulses from junction 38. The output of OR Gate 282 comprises one input to an AND Gate 284.

A second differentiating circuit 286 and rectifying circuit 288 detect the leading edge of each detected signal pulse at junction 38 and generate a leading edge pulse from each such detected signal pulse. Each leading edge pulse is delayed in a delay device 290, the latter having a delay equal to the normal relaxation period of mono stable 280. The delayed leading edge pulses provide the second input to AND Gate 284.

An output from AND Gate 284 constitutes a set signal for a bi-stable device 286. A reset signal is obtained via in inverting amplifier 288 from the output of OR Gate 282.

The set output conditions of bi-stable 286 constitute the gate impulses required.

It will be noted that in view of the delay introduced by mono stable 280 and the complimentary delay of delay device 290 (which may, for example, be a shift register or delay line) a compensating delay is required in the signal from camera 14. In the event that the video signal from the camera is delayed, a delay line is required of equivalent delay to that of delay device 290 of FIG. 10. In the event that the detected signal pulses from detector 66 are to be delayed, a shift register can be employed arranged to introduce again the same delay as that of delay device 290.

By way of example, a shift register 292 is shown in FIG. 10 connected between the output of threshold detector 66 and OR Gate 74, previously described with reference to FIG. 1.

The effect of the circuit of FIG. 10 is to add an electrical pulse of duration equal to the relaxation period of the mono stable device 280 to the trailing edge of each detected signal pulse appearing at junction 38. Provided the duration of the relaxation period is greater than the time required for the scanning spot, the pulses obtained at various points in the circuit of FIG. 10 will be as shown in FIGS. 11 (b), (c) and (d) given the five widely spaced line scans intersecting a ring feature shown in FIG. 11(a). The points in the circuit of FIG. 10 to which the various sets of wave forms apply have been denoted by the appropriate letter B, C or D.

ALTERNATIVE METHOD OF REMOVING FIELD REPRESENTATION COMPONENT FROM PICTURE SIGNAL OBTAINED FROM SCANNING SKETCH PAD SURFACE

As mentioned in the description of FIG. 1, amplifier 30 is provided to deliver a gain control voltage to each of amplifiers 32 and 32 dashed to compensate for beam intensity variation due to the presence of the video signal and/or detected video signal (in the event that switch 71 in FIG. 1 is closed) at the cathode of the CRT 10.

The alternative arrangement for compensating for image component content in the output of photo multipliers 20, 44 etc. is shown in FIG. 12. This alternative circuit replaces the variable gain amplifiers 32 and 32 dashed with summing amplifiers 294 and 296 respectively. The output from photo multiplier 20 is applied via the first summing resister 298 to the input of amplifier 294 and likewise photomultiplier 44 output is applied via a summing resistor 300 to the input of amplfier 296.

The output of non linear amplifier 30 appears at junction 31 and this junction is shown in FIG. 12. Signal from this junction is inverted by an inverting amplifier 302 and the inverted signal applied via summing resistors 304 and 306 respectively to the inputs of amplifiers 294 and 296 respectively.

The outputs of amplifiers 294 and 296 are applied to detectors 34 and 34' in the same manner as described with reference to FIG. 1 and the remainder of the circuit is identical to that shown in FIG. 1.

The operation of this alternative arrangement is successful since the image component content of the output signals from the photo multipliers 20 and 44 etc. is only very small and to the first approximation, a simple subtractive correction will eliminate the component.

An alternative approach to removing the image component from the photo multiplier outputs is shown in FIG. 13. The circuit of FIG. 13 is identical to that of FIG. 1, except that amplifier 30 and variable gain amplifiers 32 and 32' are no longer required. Instead a series of switches are provided in the input circuit of amplifier 16 serving to supply the video signal on camera 14 and/or the detected signal from output line 70 to the cathode of CRT 10. As shown, the three switches may be ganged so as to be operable from one position to the other by a single control.

In the position shown earth potential is applied to each of the summing resistors 62 and 60 but battery potential is applied to a third additional summing resistor 308 from a source of DC such as cell 310. The value of the voltage appearing at the input to amplifier 16 is adjusted such that the output voltage is sufficient to produce a uniform white display on the CRT screen.

The switches 312, 314 and 316 are operable into their other position in which event the battery voltage is removed from the input to amplifier 16 and the video signal and/or detected video signal from line 70 are once again supplied thereto.

The further switch 72 in the output line 70 is also conveniently ganged to the switches 312 to 316, the interlock between the switches being such that switch 72 is closed to provide a continuous output path when the switches 312 to 316 are in the position shown in FIG. 13.

In operation, with no delineation on the screen of the CRT 10, switches 312 to 316 are switched to the position not shown in FIG. 13 and switch 72 is opened. This causes the video signal from television camera 14 to be displayed on CRT 10 and if switch 71 is also closed, the detected signal on output line, 70 also to be displayed on CRT 10.

Using suitable marking medium, the required delineation is applied to the screen of the CRT 10 or to the plate 26 as described with reference to FIG. 1 and when the delineation is complete switches 312 to 316 are adjusted to the position shown in FIG. 13 and simultaneously switch 72 is closed. Changing switches 312 to 316 removes the video signal from CRT 10 and the application of the battery voltage to the amplifier 16 produces a uniform white illumination of the CRT 10. The delineated marks stand out in strong contrast against the uniformly illuminated background and no video signal component appears in the output signals of the photo multipliers 20, 44 etc.

The switches 312 to 316 and 72 may be operated automatically by means of a divider network 318 supplied with the overflow signal from counter 146 of scan timing system 24. The divider is arranged to divide by two so that the switches 312 to 316 and switch 72 are changed from one position to the other alternately from one frame scan to the next. In this way the operator sees a flickering representation of the image seen by the camera 14, on the CRT 10 which enables the appropriate delineation to be made with reference to the feature content in the image. However, during alternate frame scans, the CRT is blanked with the battery voltage to produce a uniform white illumination during which time the delineation alone is seen by the photo multiplier's 20 44.

A further switch 320 is required when automatic flicker operation is provided. The switch 320 is provided in series with switch 72 and is normally opened to prevent detected signal pulses from passing to the remainder of the image analysing computer. However, as soon as the required delineation has been completed, switch 320 is closed so that during the next frame scan when switch 72 is closed, the detected video signal pulses can pass to the remainder of the computer.

UTILIZATION OF PICTURE SIGNAL — GATING PULSES DERIVED BY SCANNING DELINEATED MARKINGS ON THE SKETCH PAD SURFACE

FIG. 14 illustrates an alternative circuit arrangement for circuit block 40 of FIG. 1.

As drawn, circuit block 40 of FIG. 1 only allows combination of the detected signal pulses appearing at junctions 38 and 52 (with or without modification by its circuits 42 and 42' respectively), as with the detected signal pulses from detector 66 (acting on the video signal from camera 14). In some applications mixing of the analogue video signal which obtains at junction 80 in FIG. 1 with the similar analogue video signals obtaining at junction 322 and 324 of FIG. 1, is desirable, especially in the event that multi grey level delineation is possible on the sketch pad surface.

The modified circuit block 40 of FIG. 14 includes a summing amplifier 326 to the input of which the video signal from junction 80 is supplied via summing resistor 328, the video signal from junction 322 via summing resistor 330 and the video signal from 324 via summing resistor 332. The combined output signal is amplified in amplifier 334 and is applied as one input to comparator 666 as described with reference to FIG. 1. The output of detector 66 constitutes output line 70 and this is denoted as such in FIG. 14.

Inverting amplifier 336 is provided between junction 324 and summing resistor 332 and this takes the place of inverting amplifier 78 in the circuit block 40 of FIG. 1.

Typical video signal wave forms obtaining at junctions 80, 322 and 324 are illustrated in FIG. 15. Addition of the pulse at junction 332 with the amplitude excursion 338 prevents the latter from going below the threshold voltage set by potentiometer 68 and denoted by the dotted line in FIG. 15, whereas addition of the inverted pulse shown at 324 with the second amplitude excursion 340 of the video signal at 80, which exceeds the threshold voltage 68 reduces the amplitude of this excursion below that of the threshold 68. The resulting video signal output pulse 342 is shown in the last line of FIG. 15.

It is not essential that the input signals to summing resistors 330 and 332 are necessarily derived from junctions 322 and 324 respectively. Any combination of signals is possible and in another arrangement summing resistor 330 may for example be connected to junction 38 and summing resistor 332 to junction 52 thereby combining the detected signal pulses from detectors 34 and 34' with the analogue video signal from junction 80 before detection by detector 66.

In a further alternative summing resistors 330 and 332 may be connected to the outputs of pulse modifying circuits 42 and 42' respectively.

FIGS. 16 and 17 illustrate a further use for the delineated markings on the sketch pad surface. In some situations, it is useful to classify different features according to their shape. Thus in FIG. 16 four differently shaped features 344, 346, 348 and 350 are shown. Each feature has been delineated by a black line on the sketch pad and inside features 346, 348 and 350 identifying markings have been added in the form of one stroke, two strokes and three strokes all substantially perpendicular to the line scan direction. The circuit of FIG. 17 distinguishes between the separate coded markings within features 346, 348 and 350 to produce an output signal on three different lines depending on which information signal is detected by the circuit.

The circuit of FIG. 17 comprises a differentiating circuit 352 which is supplied with detected video signal pulses from junction 38 of FIG. 1. A rectifying circuit 354 is provided to remove differentiated signals by corresponding to leading edges of detected signal pulses leaving only the trailing edge pulse which serves as a set signal for a bistable device 356. The set output of the latter constitutes one input to an AND gate 358 and other input of which is connected to junction 38.

A reset signal for bistable 356 is derived from the output of an inverting amplifier 360 the input of which is derived from junction 362 in the output of circuit 42 of FIG. 1. Thus the signal appearing at junction 362 constitutes the gating signal pulses derived from the video signal amplitude excursions of photomultiplier 20 as detected by detector 34.

Signal pulses from junction 38 which are released by AND gate 358 during a set condition of bistable 356, are differentiated by a further differentiating circuit 364 to provide shift pulses for a shift register generally designated 366. A one condition is applied continuously to the input of the first stage of the register and a reset signal, resetting all the stages in the register to a zero condition is obtained from the output of inverting amplifier 360. In consequence, as soon as a gating pulse at 362 ceases, the shift register 366 is immediately reset to zero.

The operation of the circuit of FIG. 17 is as follows:

Considering first the single detected video signal pulses obtained from threshold detector 24 during the first line scan intersections with an outline feature, the bistable device 356 will be SET at the end of each such pulse at the effect of the inverting amplifier 360 supplied with the output from circuit 42, is to apply an over-riding reset signal to the bistable device 356.

During subsequent line scans which intersect the outline delineation twice, the trailing edge of the first intersect pulse will cause bistable device 356 to be SET. This is because the gating signal pulse from circuit 42 will now be present and will be applied to the inverting amplifier 360 as the spot scans inside the outline delineation. The SET output of 356 therefore enables AND gate 358 so that the subsequent detected signal pulse at junction 38 can pass through gate 358 and after differentiation by circuit 364, the pulse causes the one condition applied to the first stage of register 366 to appear in the output thereof. As soon as the gating signal pulse at junction 362 decays to zero, the inverting amplifier 360 provides a reset signal for bistable 356 and also a reset signal for register 366.

On a line scan which intersects both the leading and trailing edges of the outline delineation and in addition one classifying mark such as contained in outline 346, of FIG. 16, the leading edge of each such mark found will cause a one condition to be shifted into the register. The second detected video signal pulse from the outline delineation will cause the one condition to be shifted along one further stage in the register.

Thus the operation can be summarized as follows, during the scanning of the middle region of delineated outlines in wich there are no identifying marks, the one will be shifted to the output of the first stage in the shift register but no one will appear at outputs K1, K2 or K3 of register 366.

When scanning across the middle region of an outline delineation containing one identifying mark such as outline 346, the one condition will be set twice before the register 366 is reset thereby causing a one condition to appear at output K1.

In a similar manner, two identifying marks will cause a one condition to appear at both outputs K1 and K2 and three identifying marks will cause a one condition to appear at all of outpus K1, K2 and K3.

The output conditions on K1, K2 and K3 are supplied to a storage device (not shown) which holds the highest value recorded for any one feature in a location which is identified by the position of the feature within the field by employing an associated parameter computer as described in our U.S. Pat. No. 3,619,494. To this end outputs K1, K2 and K3 are prefereably decoded to provide a binary digital signal one, two or three which is applied to the input of the assoicated parameter computer. The input to the coincidence detector which not only defines the anti-coincidence point for the outline but also controls the operation of the associated parameter computer is applied with the signal from junction 362. In this way the decoded value of any information marks contained within the delineated outlines is available at the anti-coincidence point for the outline.

As described in our co-pending Application Ser. No. 85,383 two or more associated parameter computers may be operated from a single coincidence detecting circuit and the input to a second associated parameter computer may be supplied with, for example, the signals from junction 82 or more preferably output line 70 of FIG. 1. The second associated parameter computer may for example be adapted to generate a binary digital signal indicative of the total area of features for which detected signal pulses are supplied to the parameter computer. Thus any detected signal pulses arising within the region defined by the outline such as 346 will be assoicated and a numerical value accumulated corresponding to the area which they represent. The value will be recirculated in the associated parameter computer store until the anti-coincidence point for the outline 346 is generated by anti-coincidence detection circuit at which time both the area value signal is released and also the signal from the first associated parameter computer (if any is there) corresponding to the coded information contained within the outline 346.

As described in our aforementioned co-pending application, the output from the first associated parameter computer can be arranged to gate the area information from the second associated parameter computer into one or more registers depending on the particular value of the coded information from the first parameter computer. In this way a shape classification and area distribution can be performed simultaneously.

LIGHT PEN DELINEATION SYSTEM FOR DEFINING AN OCTAGONAL REGION FROM TWO SELECTED POINTS

The light pen systems illustrated in FIGS. 4 to 6 generate rectangular or square outlines and whereas this type of shape is suitable for many situations, it is often desirable to delineate an outline more nearly approximating to a circle.

This can be achieved using a pen tracker unit and scan-conversion storage tube as shown in FIG. 7. However this does entail tracing the entire outline on the C.R.T. using the pen.

The circuit of FIGS. 18*a* and 18*b* (the two are intended to be read as one and the complete circuit will be referred to as that of FIG. 18) enables an octagonal region to be defined.

The description of the circuit is as follows:

In the circuit block 24 horizontal counter has system clock pulses applied thereto and on reaching overflow clocks on the vertical counter. These two counters define any picture point on the screen by X and Y co-ordinates. The block 24 thus corresponds to the same block 24 in FIG. 4.

Cricuit block 378 consists of two registers which are controlled by switch 380 and switch 382 and a "load co-ordinate" signal from the light pen switch as described with reference to FIG. 4. When the light pen is enabled and switch 380 is closed the co-ordinates of that picture point are loaded in the X and Y registers. With switch 382 closed and the light pen enabled, the X and Y co-ordinates of point B are loaded. Points A and B are shown in FIG. 18*c*.

Circuit block 384 takes the X co-ordinate of position A ($X_A$) and X co-ordinate of position B ($X_B$) and subtracts them and the resultant is loaded into X' register.

Circuit block 386 divides X' by three giving a whole number, the remainder is ignored and the resultant loaded into the X'/3 register.

Circuit block 388 multiplies X'/3 by three giving a corrected X' and this is put into corrected X' register ($X'_C$).

Circuit block 390 multiplies X'/3 by two giving 2X'/3 and this is loaded into 2X'/3 register.

At this point there is now sufficient information to generate co-ordinates of the first line of frame of interest.

Circuit block 392 takes Y co-ordinate of position A ($Y_A$) and subtracts $X'_C$ and this generates Y co-ordinate of the top line of the octagon, and the result is stored in Y1 register.

Circuit block 394 takes X co-ordinate of position A ($X_A$) and subtracts $X'_C$ and this generates $X_1$, i.e. the co-ordinate of left hand side of octagon, and the result is stored in X1 register.

Circuit block 396 takes X1 and adds 2X'/3 and stores result $X_2$, and is the co-ordinate of one third of the distance along the top line of the octagon.

Circuit block 398 takes $X_2$ and adds 2X'/3 and stores result $X_3$, which is the co-ordinate of two thirds of the distance along the top line.

Circuit block 400 defines the top chord $X_2 - X_3$. The running Y co-ordinates from 24 are compared with Y1 co-ordinates and when they are the same, bistable 402 is SET, giving the correct Y line. This bistable is reset by a signal from system timing at the end of every Y line e.g. the pulse which clocks on vertical counter. (Multiple resets do not matter).

The other bistable 404 defines an X window. It is SET when the running X co-ordinates $= X_2$ co-ordinates and RESET when system X co-ordinates $= X_3$ co-ordinates. The sET outputs of the two bistables 402, 404 are combined in an AND gate to give the uppermost chord of the octagonal shape.

Circuit block 406: The chord obtained from 400 is applied to an OR gate 408 to give a solid frame signal, the other inputs for OR gate 408 being derived later.

Circuit block 410 differentiates the trailing edge of the first line co-ordinate.

Circuit block 412 is an OR gate to which various signals to load counter 15 are supplied. The first one is from block 410.

Circuit 414 is a down counter, and on the load command loads the number 2X'/3 into the counter and is clocked by the differentiated trailing edge from differentiator 416 acting on the signal from a delay line 418.

Circuit 420: The first line chord from circuit 400 passes to the delay line via an OR gate 422, the other input signal for the OR gate coming from the output of the delay line 418, and so forms a recirculating system. The AND gate 424 only allows the output from OR gate 422 into the delay line providing the whole sequence has not been completed.

The delay line 418 is of one line scan period and is capable of being decoded early in the event that the appropriate logic conditions apply, and in addition a short delay 426 is provided to give more than one line scan period delay overall. Bistable 428 is SET by the differentiated trailing edge of first line chord from 410. This controls the number of lines for which the initial chord is going to be allowed to expand, and so enables the AND gates 430 and 432 to add $\delta t$ to the beginning and $\delta t$ to the end of the recirculating chord. ($\delta t =$ the time delay of delay 426) AND gate 434 is enabled, and is controlled by the shrink back bistable 436 to be described later. It is reset when the down counter reaches zero indicated by zero detect 438 via AND gate 440.

OR gate 442 takes the required information for recirculation through the delay line 418, 426. Every line the differentiated trailing edge from 416 clocks the counter 414 down. This signal is combined in OR gate 408 as part of the required frame. Bistable 444 defines a straight edge and is SET at the same time as the expand bistable 428 resets and the down counter 414 is reloaded. The recirculation of the frame continues, gates 430, 432 are inhibited, 434 remains open. When the counter 444 is reset and the shrink back bistable 436 is SET via AND gate 446, and the counter 414 reloaded.

Recirculation again carries on, the AND gates 448, 450, 452 ensure that the chord is shrinking by $\delta t$ on the leading and trailing edges.

AND gate 454 detects that the appropriate number of shrink back lines have been completed and sets Bistable 456, the SET condition ending the recirculation since the octagonal frame is complete.

The frame FIG. 19, thus generated is a solid frame i.e. the pulses from OR gate 408 are gating pulses as hereinbefore defined. If an outline trace is required these may be converted to suitable short duration pulses by differentiating the leading and trailing edges of all except the first and last gating pulses in known manner.

ALTERNATIVE METHOD OF PRODUCING THE REPRESENTATION OF THE IMAGE ON OR ADJACENT THE SKETCH PAD SURFACE

FIG. 20 illustrates an optical method of obtaining a representation of an image on a screen 368. To this end the image is illuminated by a lamp 370 and the image is focussed by means of the usual focussing lens 372 so as to be in focus on a flat screen 368 after reflection by a semi-reflecting mirror 374. A television camera 376 is mounted above the semi-reflecting mirror and adjusted in height above the screen so that the image on the screen is just in focus on the camera target.

Delineation may be achieved by marking the screen with any convenient marking medium which will produce for example a dark line in the event that the screen is white. After delineation is complete, the video signal from the camera 376 can be processed. Video signal amplitude excursions relating to the delineations can be removed from those corresponding to the image by suitable thresholding techniques as described with reference to FIG. 3 hereof so that the signals relating to the delineations can be used for example to gate the video signal corresponding to the image.

In the event that the delineated marks are required to improve the image, the combination of the delineation and image is effected automatically by virtue of the image of the displayed image on the screen and the image of the delineations thereon being superimposed on the camera target and being scanned simultaneously by the camera scanning beam.

What we claim is:

1. A method of amending a picture signal obtained by scanning a field containing features, comprising the steps of: scanning the field at a predetermined rate to produce a first picture signal representative of the field, displaying said first picture signal on a C.R.T. also scanned at said predetermined rate, delineating on a surface in front of said C.R.T. a correction required to at least one of said features, generating a second picture signal from said delineation and from the display scan of said C.R.T. in synchronism with the generation of the first picture signal, and combining said first and second picture signals.

2. The method of claim 1 further comprising the step of: forming the surface of transparent plate and situating said plate in front of the representation of the field.

3. The method of claim 1, wherein said step of delineating includes the step of: forming a plurality of points defining a complex shape.

4. The method of claim 1 further comprising the step of: removing the representation of said field at least from the field of view of a means scanning said delineations to produce said second picture signal.

5. The method of claim 1 further comprising the steps of: inverting first picture signal and combining said inverted first picture signal with the second video signal to cancel out the first signal component therein.

6. The method of claim 1 wherein: said step of combining includes the step of adding said first and second signals.

7. The method of claim 1 further comprising the step of: obtaining two value signals by threshold detection of the original amplitude modulated video signals and wherein said step of combining includes the step of OR gating said first and second signals.

8. The method of claim 1 further comprising the steps of: delineating the missing portion of a feature displayed in a representation of the field on the surface, scanning the delineation to produce the second picture signal, detecting the amplitude excursions thereof to produce detected signal pulses corresponding to the missing portions, those detected signal pulses constituting a subsidiary detected signal; and combining the pulses of the subsidiary detected signal with those of the first picture signal obtained by scanning the field.

9. The method of claim 1 further comprising the steps of: electronically joining two or more features displayed in the representation of the field as being separated by delineating on the surface a bridging portion to close the gap between the two features in the representation of the field, scanning the delineated region, detecting the video signal amplitude excursions obtained thereby and, combining the detected signals with those of the first picture signal.

10. The method of claim 1 further comprising the step of: blanking the C.R.T. so as to provide uniform illumination on the screen, when the delineated marking is to be scanned.

11. The method of claim 1 further comprising the step of: projecting the display on the C.R.T. onto said surface.

12. The method of claim 1 further comprising the step of: locating the C.R.T. screen relative to the surface so as to be seen therethrough.

13. The method of claim 1 further comprising the step of: producing the second picture signal by line scanning.

14. The method of claim 1 further comprising the steps of: removing said first picture signal representing the original field and uniformly illuminating the surface while the delineated marks are scanned to produce the second picture signal.

15. The method of claim 1 wherein said step of delineating includes the step of: forming a line in a closed loop.

16. The method of claim 15 further comprising the steps of: converting the second picture signal pulses into gating pulses and employing said gating pulses to cause brightening of the scanning spot of said C.R.T. for producing a bright region on the C.R.T. screen corresponding in shape and proportional in size to the delineated outline.

17. The method of claim 1 further comprising the step of: subjecting the actual video signal obtained by scanning the field to threshold detection to produce a two level detected signal which is displayed instead of the original video signal on the C.R.T.

18. The method of claim 17 further comprising the step of:

subjecting the video signal obtained by scanning the delineations to threshhold detection to produce a two level detected signal as said second picture signal.

19. The method of claim 18 further comprising the step of:

making measurements on the signal formed by combining the first and second picture signals.

20. The method of claim 1 further comprising the step of: focussing the C.R.T. screen display onto a photomultiplier target so that the scanning spot of the C.R.T. and the photomultiplier combine to form a flying spot scanner.

21. The method of claim 20 further comprising the step of: making the delineations in opaque ink on the surface situated just in front of said C.R.T.

22. The method of claim 21 further comprising the step of: reducing the effect of ambient light variation by using a dual-phosphor tube in said C.R.T. wherein, the secondary phosphor produces a U.V. component and the photomultiplier is only sensitive to U.V. light.

23. The method of claim 1 in which said step of delineating further comprises the step of: masking out a selected region.

24. The method of claim 23 further comprising the steps of: obtaining gating pulses by scanning the masked out region and threshold detecting the second picture signal amplitude excursions so obtained.

25. The method of claim 24 further comprising the step of: employing the gating pulses to brighten up the scanning spot of said C.R.T.

26. The method of claim 24 further comprising the step of: employing the gating pulses generated from the second picture signal to gate the first picture signal so as to release the latter corresponding to the region bounded by the delineation.

27. The method of claim 24 further comprising the step of: employing the gating pulses generated from the second picture signal to gate the first picture signal so as to release the latter corresponding to the region outside the delineated region.

28. The method of claim 1 in which said step of delineating further comprises the step of: making one delineation on the surface in a different colour from another delineation.

29. The method of claim 28 further comprising the steps of: separating the second picture signal pulses relating to the one delineation from those relating to the other by filtering the light passing through the delineations to remove the unwanted wavelengths and supplying the filtered light beams to two separate scanning devices.

30. The method of claim 28 further comprising the steps of: employing a single scanning device and threshold detecting the amplitude modulated video signal obtained from the scanning device with reference to a plurality of different threshold levels to enable the different amplitude level excursions fo the video signal relating to the different colours to be distinguished one from the other.

31. The method of claim 28 further comprising the steps of: inserting separate different optical filtering devices between the surface and a single scanning means during different frame scans to obtain a form of time multiplexing, and gating the output of the scanning device during the appropriate frame scans to produce the different picture signals.

32. The method of claim 31 further comprising the step of: storing the separate picture signals for subsequent simultaneous address.

33. Apparatus for amending a picture signal comprising: means for scanning a field or an image thereof to produce a first picture signal representing the field, a surface, means for displaying said first picture signal on said surface, means for delineating on the surface a correction required to a feature in the field, means responsive to said displaying means for generating a second picture signal which represents the delineations in synchronism with the generation of the first picture signal and means for combining the first and second picture signals.

34. A method of amending an image of an object projected on a screen comprising the steps of:

projecting an image of said object on a semi-reflecting mirror, reflecting said projected image onto a screen, delineating desired amendments on said screen, and scanning said screen with a television camera to detect the image of said object combined with said delineated amendments thereto.

35. The method of claim 34 further comprising the step of: removing said projected image prior to scanning the delineations on the surface.

36. A method of amending a picture signal obtained by scanning a field containing features, comprising the steps of:

scanning the field at a predetermined rate to produce a first picture signal representative of the field, displaying said first picture signal on a C.R.T. also at said predetermined rate, electronically delineating a correction required to a least one of said features by a light pen which is actuated from the display scan of said C.R.T., generating from the actuation of the light pen a second picture signal of said delineation in synchronism with the generation of the first picture signal and combining said first and second picture signals.

37. The method of claim 36 wherein said step of combining includes the step of:

adding said first and second signals.

38. The method of claim 36 further comprising the step of:

obtaining two value signals by threshhold detection of the original amplitude modulated video signals and wherein said step of combining includes the step of OR gating first and second signals.

39. The method of claim 36 further comprising the steps of: storing the instantaneous co-ordinate positions of the light pen relative to the scan raster in a memory and addressing said memory to release the stored signals as the second picture signal is synchronism with the scanning.

40. The method of claim 39 further comprising the step of: amplifying the second picture signal to generate a brightness control signal which is applied to the C.R.T. to adjust the brightness of the scanning spot of the C.R.T. in response to the signals from the memory, to produce for example a bright line trace on the C.R.T. over the region thereof determined by the stored co-ordinate values.

41. The method of claim 36 further comprising the step of:

subjecting the actual video signal obtained by scanning the field to threshhold detection to produce a two level detected signal.

42. The method of claim 41 further comprising the step of:

subjecting the video signal obtained by scanning the delineations to threshhold detection to produce a two level signal as said second picture signal.

43. The method of claim 42 further comprising the step of:

making measurements on the signal formed by combining first and second picture signals.

44. A method of amending a picture signal obtained by line scanning a field containing features, comprising the steps of:

scanning the field at a predetermined rate to produce a first picture signal representative of the field, displaying said first picture signal on a C.R.T. also scanned at said predetermined reate, delineating a correction on a surface near to the C.R.T. display, generating a second picture signal which represents the delineated correction in synchronism with the scanning of the field, and subtracting the second picture signal from the first picture signal.

45. The method of claim 44 further comprising the step of:

subjecting the actual video signal obtained by scanning the field to threshhold detection to produce a two level detected signal.

46. The method of claim 45 further comprising the step of:

subjecting the video signal obtained by scanning the delineations to threshhold detection to produce a two level detected signal as said second picture signal.

47. The method of claim 46 further comprising the step of:

making measurements on the pulses which remain after the second picture signal is subtracted from the first picture signal.

* * * * *

UNITED STATES PATENT AND TRADEMARK OFFICE

CERTIFICATE OF CORRECTION

PATENT NO. : 3,835,245

DATED : SEPTEMBER 10, 1974

INVENTOR(S) : LEON ANDRE PIETERS

It is certified that error appears in the above-identified patent and that said Letters Patent are hereby corrected as shown below:

At Column 13, line 14, after "12313/71" add --(now British Patent No. 1,387,406, corresponding to U. S. Patent No. 3,801,741)--; and after "12751/71" insert --(now abandoned)--.

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*